US012602124B2

(12) United States Patent
Park et al.

(10) Patent No.: US 12,602,124 B2
(45) Date of Patent: Apr. 14, 2026

(54) DISPLAY DEVICE INCLUDING A TOUCH SENSOR AND MANUFACTURING METHOD THEREOF

(71) Applicant: SAMSUNG DISPLAY CO., LTD., Yongin-si (KR)

(72) Inventors: Jun Hong Park, Yongin-si (KR); Jeong Won Kim, Yongin-si (KR); Kab Jong Seo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/931,360

(22) Filed: Oct. 30, 2024

(65) Prior Publication Data

US 2025/0328202 A1 Oct. 23, 2025

(30) Foreign Application Priority Data

Apr. 22, 2024 (KR) ........................ 10-2024-0053393

(51) Int. Cl.
*G06F 3/041* (2006.01)
*G06F 3/044* (2006.01)
(52) U.S. Cl.
CPC .......... *G06F 3/0412* (2013.01); *G06F 3/0445* (2019.05)
(58) Field of Classification Search
CPC ...... G06F 3/041–047; G06F 2203/041–04114; G06F 2203/04112; H10K 59/40; G02F 1/133512
See application file for complete search history.

(56) References Cited

U.S. PATENT DOCUMENTS

| | | | |
|---|---|---|---|
| 10,504,971 B2 | 12/2019 | Yang et al. | |
| 11,720,194 B2 | 8/2023 | Park et al. | |
| 11,726,593 B2 | 8/2023 | Kong et al. | |
| 11,755,155 B2 | 9/2023 | Yoo et al. | |
| 2018/0197924 A1* | 7/2018 | Tada ..................... | H10K 77/111 |
| 2020/0328363 A1* | 10/2020 | Guo ....................... | H10K 59/40 |
| 2021/0120324 A1* | 4/2021 | Seo ........................ | H10K 59/12 |
| 2021/0357060 A1 | 11/2021 | Kim et al. | |
| 2024/0241609 A1* | 7/2024 | Min ...................... | G06F 3/0448 |

FOREIGN PATENT DOCUMENTS

| | | |
|---|---|---|
| KR | 10-2020-0034908 A | 4/2020 |
| KR | 10-2022-0096094 A | 7/2022 |
| KR | 10-2023-0024479 A | 2/2023 |
| KR | 10-2534273 B1 | 5/2023 |
| KR | 10-2023-0111642 A | 7/2023 |

* cited by examiner

*Primary Examiner* — Sanjiv D. Patel
(74) *Attorney, Agent, or Firm* — F. CHAU & ASSOCIATES, LLC

(57) ABSTRACT

A display device includes a display panel, a first insulating layer disposed on the display panel, and a sensing pattern disposed on the first insulating layer and including conductive lines, wherein a surface of the first insulating layer has a recess portion, and the conductive lines include a first line layer disposed within the recess portion, and a second line layer disposed between the first insulating layer and the first line layer.

20 Claims, 21 Drawing Sheets

1

DISPLAY DEVICE INCLUDING A TOUCH SENSOR AND MANUFACTURING METHOD THEREOF

CROSS-REFERENCE TO RELATED APPLICATION

This application claims priority under 35 U.S.C. § 119(a) to Korean Patent Application No. 10-2024-0053393, filed on Apr. 22, 2024, in the Korean Intellectual Property Office, the entire contents of which are herein incorporated by reference.

BACKGROUND

1. Technical Field

The present invention relates to a display device including a touch sensor, and more particularly display device having a sensing pattern.

2. Discussion of Related Art

Display devices have become an important connection medium between a user and information as information technology has developed.

A display device may include a touch sensor to receive the user's touch input. The touch sensor may be attached to a surface of the display panel or may be manufactured integrally with the display panel. The user may input information by pressing or touching the touch sensor while viewing an image displayed by the display device.

SUMMARY

Embodiments of the present disclosure are intended to provide a display device including a touch sensor with improved sensing sensitivity.

Embodiments of the present disclosure are intended to provide a manufacturing method of the above-described display device.

A display device according to an embodiment of the present disclosure includes a display panel, a first insulating layer disposed on the display panel, and a sensing pattern disposed on the first insulating layer and including a plurality of conductive lines, wherein a surface of the first insulating layer has a recess portion, and wherein the plurality of conductive lines includes a first line layer disposed within the recess portion, and a second line layer disposed between the first insulating layer and the first line layer.

The first line layer and the second line layer may protrude from the surface of the first insulating layer.

The first line layer may have a line layer recess portion.

The plurality of conductive lines may include a light blocking layer disposed on the first line layer and the second line layer.

A display device according to an embodiment of the present disclosure includes a substrate, a plurality of pixels disposed on the substrate, a first insulating layer disposed on the plurality of pixels, a sensing pattern disposed on the first insulating layer and including a plurality of conductive lines, and a second insulating layer disposed on the sensing pattern, wherein the first insulating layer has a recess portion on a surface facing the sensing pattern and wherein the plurality of conductive lines includes a first line layer disposed within the recess portion and a second line layer disposed between the first insulating layer and the first line layer.

The plurality of conductive lines may further include a light blocking layer disposed on the first line layer and the second line layer.

The light blocking layer may be disposed between the plurality of conductive lines and the second insulating layer.

The light blocking layer may be disposed between the recess portion of the first insulating layer and the second line layer, and may partially surround the second line layer.

The first line layer may have a bottom surface adjacent to the first insulating layer, an top surface opposite to the bottom surface and adjacent to the second insulating layer, and first and second side surfaces connecting the bottom surface and the top surface, and the light blocking layer may is disposed on the top surface of the first line layer.

The light blocking layer may include a colored metal material or a light blocking material.

The plurality of conductive lines may further include an auxiliary insulating layer.

The light blocking layer may be disposed between the first line layer and the second insulating layer, and the auxiliary insulating layer may be disposed between the first line layer and the light blocking layer.

The light blocking layer may be disposed between the second line layer and the first insulating layer, and the auxiliary insulating layer may be disposed between the second line layer and the light blocking layer.

The light blocking layer may include a first sub-light blocking layer disposed between the first line layer and the second insulating layer, and a second sub-light blocking layer disposed between the second line layer and the first insulating layer, and the auxiliary insulating layer may include a first sub-auxiliary insulating layer disposed between the first line layer and the first sub-light blocking layer, and a second sub-auxiliary insulating layer disposed between the second line layer and the second sub-light blocking layer.

The first insulating layer may include a low-temperature inorganic layer or a low-temperature organic layer.

The first line layer may include copper, and the second line layer may include titanium.

The recess portion may have a polygonal shape or a rounded shape when viewed in cross section.

A manufacturing method of a display device according to an embodiment of the present disclosure includes providing a display panel, providing a first insulating layer on the display panel, forming a plurality of sensing patterns on the first insulating layer, each sensing pattern including a plurality of conductive lines, and providing a second insulating layer on the plurality of sensing patterns, wherein the forming of the plurality of sensing patterns includes forming a recess portion on a surface of the first insulating layer facing the plurality of sensing pattern, providing a first material within the recess portion, providing a second material within the recess portion including a low-resistance metal on the first material, and forming a first line layer disposed in the recess portion and a second line layer disposed between the first line layer and the first insulating layer by removing a portion of the first material and the second material to expose a portion of the surface of the first insulating layer, wherein the first line layer is formed from the second material, and the second line layer is formed from the first material.

The forming the plurality of sensing patterns may further include forming a light blocking layer overlapping the recess portion and partially surrounding the first line layer and the second line layer.

The forming the plurality of sensing patterns may further include forming an auxiliary insulating layer disposed between the light blocking layer and at least one of the first line layer or the second line layer.

DETAILED DESCRIPTION

Figure 1:
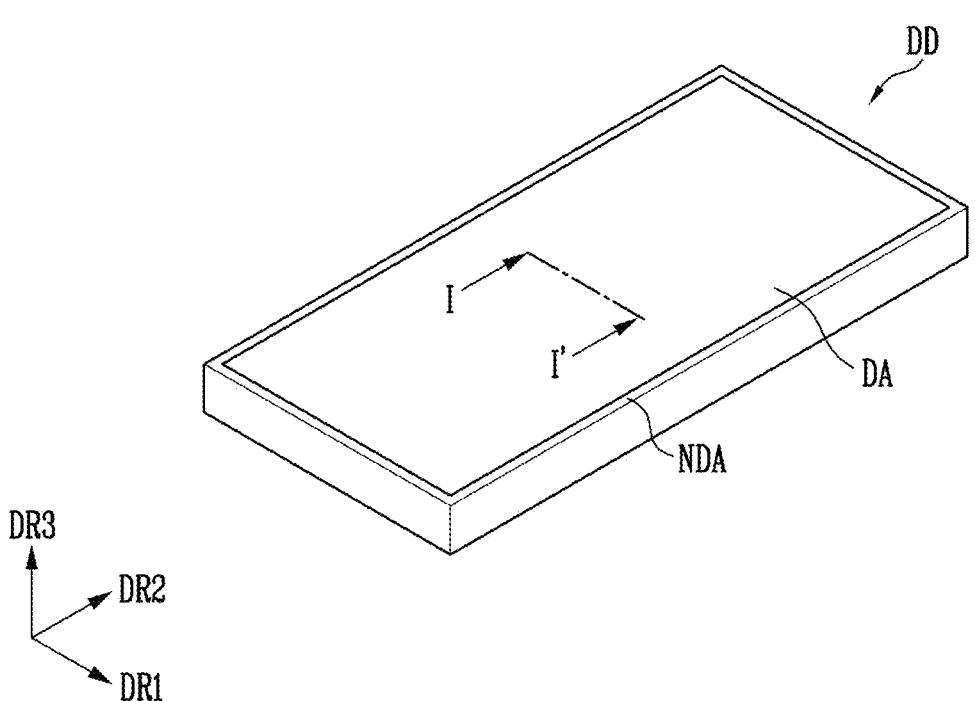
FIG. 1 is a perspective view showing an embodiment of a display device of the present disclosure.

Hereinafter, embodiments of the present disclosure will be described in detail with reference to the attached drawings. Inventive concepts may be embodied in different forms and should not be construed as limited to embodiments set forth herein. Rather, embodiments are provided so that this disclosure will be thorough and complete, and will fully convey the scope of present description to those of ordinary skill in the art.

In the description, components for understanding an operation according to the present disclosure will be described. Descriptions of other components may be omitted so that the subject matter may be clearly understood.

Throughout the specification, when an component is said to be "connected" to another component, this includes the case where the components may be "directly connected" and the case where the components may be "indirectly connected" with another element therebetween. The terms used in this specification is for the purpose of describing embodiments and are not intended to limit the present disclosure. It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. "At least one of X, Y, and Z", and "at least one selected from the group consisting of X, Y, and Z" may be interpreted as X, Y, Z, or any combination thereof of two or more among X, Y, and Z (e.g., XYZ, XYY, YZ, and ZZ). Here, "and/or" includes any combination of one or more of the constituents.

It will be understood that, although the terms "first," "second," etc. may be used to describe various components, but these components are not limited by these terms. These terms are used only to distinguish one constituent element from another constituent element. Accordingly, the first component may be referred to as the second component within the scope of what is disclosed herein.

Spatially relative terms such as "below," "above," etc. may be used for descriptive purposes, thereby describing the relationship of one component to another component or components as shown in the drawings. do. Spatially relative terms are intended to include different directions in use, operation, and/or manufacture in addition to the directions depicted in the drawings. For example, if the device shown in the drawings is turned over, components depicted as being disposed "below" other components may be disposed "above" the other components. Accordingly, the term "below" may include both above and below directions. Additionally, the device may be oriented in other directions (e.g., rotated by 90 degrees or in other orientations), and thus the spatially relative terms used herein should be interpreted accordingly.

In the drawings, dimensions may be exaggerated for clarity of illustration. Accordingly, embodiments disclosed herein should not be construed as being limited to the specific shapes shown, and should be construed to include changes in shapes that occur, for example, as a result of manufacturing. As such, the shapes shown in the drawings may not depict the actual shapes of areas of the device, and embodiments are not limited thereto.

FIG. 1 is a perspective view showing an embodiment of a display device according to an embodiment of the present disclosure.

Referring to FIG. 1, the display device DD may be an electronic device having a display surface. The display device DD may be an electronic device having a display surface formed on at least one surface thereof. The display device DD may be an electronic device such as a smartphone, a television, a tablet personal computer (PC), a mobile phone, a video phone, an e-book reader, a desktop PC, a laptop PC, a netbook computer, a workstation, a server, a PDA, a portable multimedia player (PMP), an MP3 player, a medical equipment, a camera, or a wearable device.

The display device DD may be provided in various shapes. For example, the display device DD may have the shape of a rectangle having two pairs of parallel sides, but the present disclosure is not limited thereto. Additionally, in FIG. 1, the display device DD is shown as having rectilinear corners, but the present disclosure is not limited thereto. For example, the display device DD provided in a shape of a rectangle may have a rounded corner where two sides meet.

In an embodiment, for convenience of description, the display device DD may have a rectangular shape with a pair of parallel long sides and a pair of parallel short sides. The long sides may extend in the second direction DR2, and the short sides may extend in the first direction DR1, and the direction perpendicular to the extension direction of the long side and the short side may be indicated as the third direction DR3. The first direction DR1 and the second direction DR2 may form a horizontal plane, and the third direction DR3 may be perpendicular to the horizontal plane formed by the first direction DR1 and the second direction DR2.

According to an embodiment, at least a portion of the display device DD may be flexible. For example, a portion of the display device DD may be folded, bent, or rolled.

The display device DD may include a display area DA and a non-display area NDA. The display area DA may display configured to display an image. The non-display area NDA may be provided on at least one side of the display area DA. The non-display area NDA may be an area that may not display the image. However, the present disclosure is not limited thereto. According to an embodiment, a shape of the non-display area NDA may be designed to be relative to the shape of the display area DA. For example, the non-display area NDA may have a rectangular shape arranged to surround the display area DA.

Figure 2:
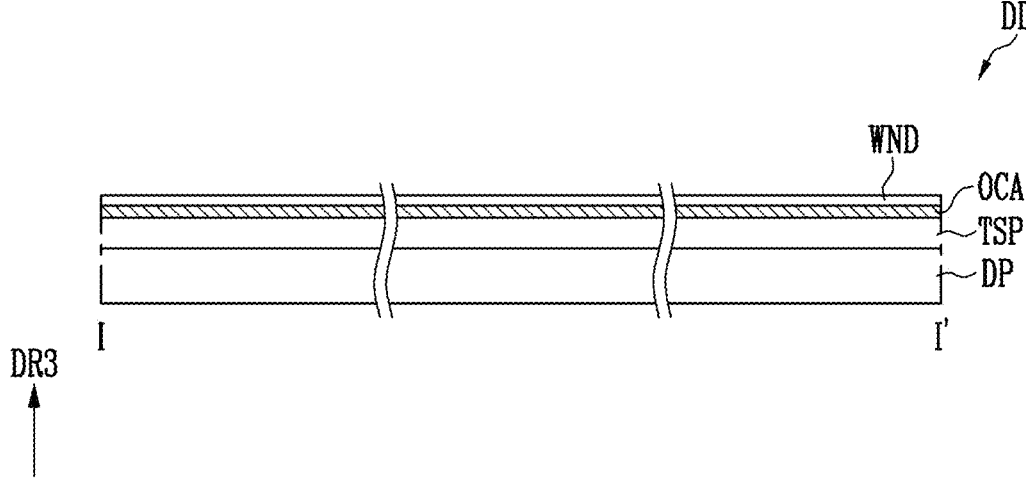
FIG. 2 is a cross-sectional view taken along a line I-I' of FIG. 1.

FIG. 2 is a cross-sectional view taken along a line I-I' of FIG. 1.

Referring to FIG. 2, the display device DD may include a display panel DP, a sensing panel TSP (or touch sensor), and a window WND.

The display panel DP may display an image in the display area DA (see FIG. 1). The display panel DP may be capable of self-emission. For example, the display panel DP may be an organic light emitting display panel (OLED panel) using an organic light emitting diode as a light-emitting element, an ultra-small light emitting diode display panel (a nano-scale LED display panel) using an ultra-small light emitting diode as a light-emitting element, or a quantum dot organic light emitting display panel (QD OLED panel) using a quantum dot and an organic light emitting diode. In addition, the display panel DP may be a liquid crystal display panel (LCD panel), an electro-phoretic display panel (EPD panel), or an electro-wetting display panel (EWD panel). When a non-light emitting display panel is used as the display panel DP, the display device DD may include a backlight unit that supplies light to the display panel DP.

The sensing panel TSP may be disposed on the display panel DP. The sensing panel TSP may receive a touch input of a user. The sensing panel TSP may sense the touch input using a mutual capacitance method or a self-capacitance method.

The window WND may be provided on the display panel DP and the sensing panel TSP. The window WND may protect the display panel DP and the sensing panel TSP from external impact. The window WND may provide an input surface and/or a display surface to the user. The window WND may be coupled to the display panel DP and the sensing panel TSP. The window WND may be coupled to the display panel DP and the sensing panel TSP using an optically transparent adhesive (or bonding) member OCA.

The window WND may have a multi-layer structure. The window WND may include one or more materials selected from a glass substrate, a plastic film, or a plastic substrate. Such a multi-layer structure may be formed by using a continuous process or a bonding process using an adhesive layer. The window WND may be flexible in whole or in part.

Figure 3:
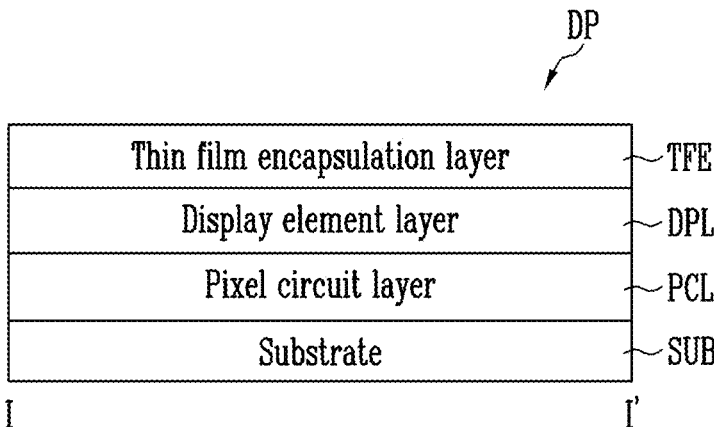
FIG. 3 is a cross-sectional view showing an embodiment of the display panel of FIG. 2.

FIG. 3 is a cross-sectional view showing an embodiment of the display panel of FIG. 2.

Referring to FIG. 3, the display panel DP may include a substrate SUB, a pixel circuit layer PCL, a display element layer DPL, and a thin film encapsulation layer TFE.

The substrate SUB may be a rigid substrate or a flexible substrate. In a case that the substrate SUB is a rigid substrate, the substrate SUB may be formed of a glass substrate, a quartz substrate, a glass ceramic substrate, or a crystalline glass substrate. In a case that the substrate SUB is a flexible substrate, the substrate SUB may be formed of a film substrate containing a polymer organic material and a plastic substrate. In addition, the substrate SUB may include fiber glass reinforced plastic (FRP).

The pixel circuit layer PCL may be disposed on the substrate SUB. In the pixel circuit layer PCL, a plurality of thin film transistors and lines connected to the thin film transistors may be disposed. For example, each thin film transistor may have a semiconductor layer, a gate electrode, and source/drain electrodes sequentially stacked with an insulating layer therebetween. The semiconductor layer may include amorphous silicon, poly silicon, low temperature poly silicon, or an organic semiconductor. The gate electrode and source/drain electrodes may include one of aluminum (Al), copper (Cu), titanium (Ti), or molybdenum (Mo). However, embodiments of the present disclosure are not limited thereto. The pixel circuit layer PCL may include at least one insulating layer.

The display element layer DPL may be disposed on the pixel circuit layer PCL. The display element layer DPL may include a light-emitting element that is configured to emit light. The light emitting element may be, for example, an organic light emitting diode, however, the present disclosure is not limited thereto. According to an embodiment, the light emitting element may be an inorganic light emitting element containing an inorganic light emitting material or a light emitting element (quantum dot display element) that is configured to emit light by changing the wavelength of emitted light using quantum dots.

The thin film encapsulation layer TFE may be disposed on the display element layer DPL. The thin film encapsulation layer TFE may be an encapsulation substrate or may be an encapsulation layer made of a multilayer. In a case that the thin film encapsulation layer TFE is in a form of an encapsulation layer, the thin film encapsulation layer TFE may include an inorganic layer and/or an organic layer. For example, the thin film encapsulation layer TFE may be in a form in which an inorganic layer, an organic layer, and an inorganic layer may be sequentially stacked. The thin film encapsulation layer TFE may inhibit or prevent external air and moisture from penetrating into the display element layer DPL and the pixel circuit layer PCL.

Figure 4:
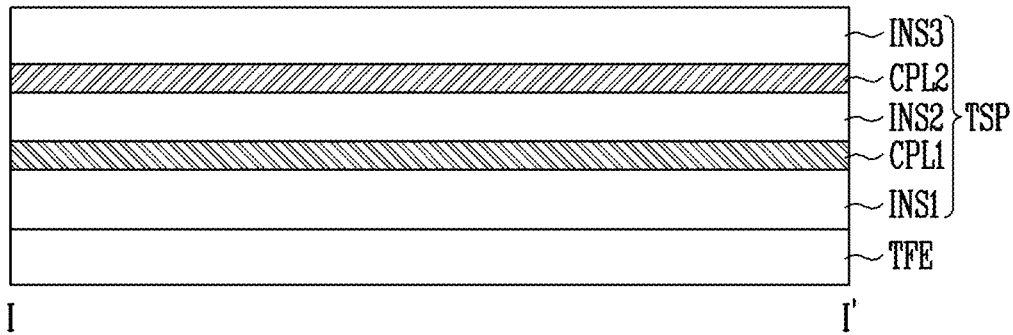
FIG. 4 is a cross-sectional view showing an embodiment of the sensing panel of FIG. 2.

FIG. 4 is a cross-sectional view showing an embodiment of the sensing panel of FIG. 2.

Referring to FIG. 4, the sensing panel TSP (or touch sensor) may be disposed directly on a display/touch surface of the display panel DP. That is, the display/touch surface of the display panel DP may be any surface from which am image may be emitted and which may receive a touch input and/or a hover input. Here, "directly disposed" may mean that the sensing panel TSP may be formed by a continuous process, and attached to the display panel DP using a separate adhesive layer (or adhesive layer).

The sensing panel TSP may detect the touch capacitance by contact and/or proximity of the user's hand or a separate input device and recognize the touch input and/or hover input of the display device DD. Here, the touch input may refer to direct touch (or contact) by the user's hand or the separate input device, and the hover input may refer that the user's hand or the separate input device is near, but not touching the display device DD, including the sensing panel TSP. The separate input device may include a conductor for interacting with an electric field of the sensing panel TSP to produce a touch response. The separate input device may include a capacitive stylus, capacitive pen caps, or capacitive gloves.

The sensing panel TSP may have a multi-layer structure. The sensing panel TSP may include at least one conductive layer and at least one insulating layer. For example, the sensing panel TSP may include a first insulating layer INS1, a first conductive layer CPL1, a second insulating layer INS2, a second conductive layer CPL2, and a third insulating layer INS3.

The first conductive layer CPL1 may be directly disposed on the thin film encapsulation layer TFE of the display panel DP, however, the present disclosure is not limited thereto. According to an embodiment, another insulating layer, for example, the first insulating layer INS1, may be disposed between the first conductive layer CPL1 and the thin film encapsulation layer TFE. In this case, the first conductive layer CPL1 may be disposed directly on the first insulating layer INS1.

According to an embodiment, the first insulating layer INS1 may be the uppermost layer of the thin film encapsulation layer TFE of the display panel DP. For example, the first insulating layer INS1 may be an insulating layer that is an uppermost layer of the thin film encapsulation layer TFE. According to another embodiment, the first insulating layer INS1 may be an insulating layer additionally disposed on the thin film encapsulation layer TFE.

The first insulating layer INS1 may include a low-temperature inorganic layer or a low-temperature organic layer. As a low-temperature process may be use, damage to the light emitting elements included in the display panel DP can be inhibited or prevented even if the sensing panel TSP is formed in a continuous process after the manufacturing process of the display panel DP.

Each of the first and second conductive layers CPL1 and CPL2 may have a single-layer structure or a multi-layer structure stacked in the thickness direction. The conductive layer of the single-layer structure may include a conductive material. For example, the conductive material may include metals such as molybdenum (Mo), silver (Ag), titanium (Ti), copper (Cu), or aluminum (Al), or alloys thereof, or transparent conductive oxides such as indium tin oxide (ITO), indium zinc oxide (IZO), zinc oxide (ZnO), or indium tin zinc oxide (ITZO).

The conductive layer having a multi-layer structure may include multiple metal layers. The multilayer metal layers may have a multilayer structure including, for example, titanium (Ti)/aluminum (Al)/titanium (Ti), but are not limited thereto. The conductive layer having a multi-layer structure may include multiple metal layers and a transparent conductive layer.

According to an embodiment, at least one of the first and second conductive layers CPL1 and CPL2 may have a multilayer structure including titanium (Ti)/copper (Cu). However, the conductive material constituting the multilayer structure is not limited to copper (Cu). A conductive material constituting the multilayer structure may have a resistance value lower than that of copper (Cu).

Figure 8:
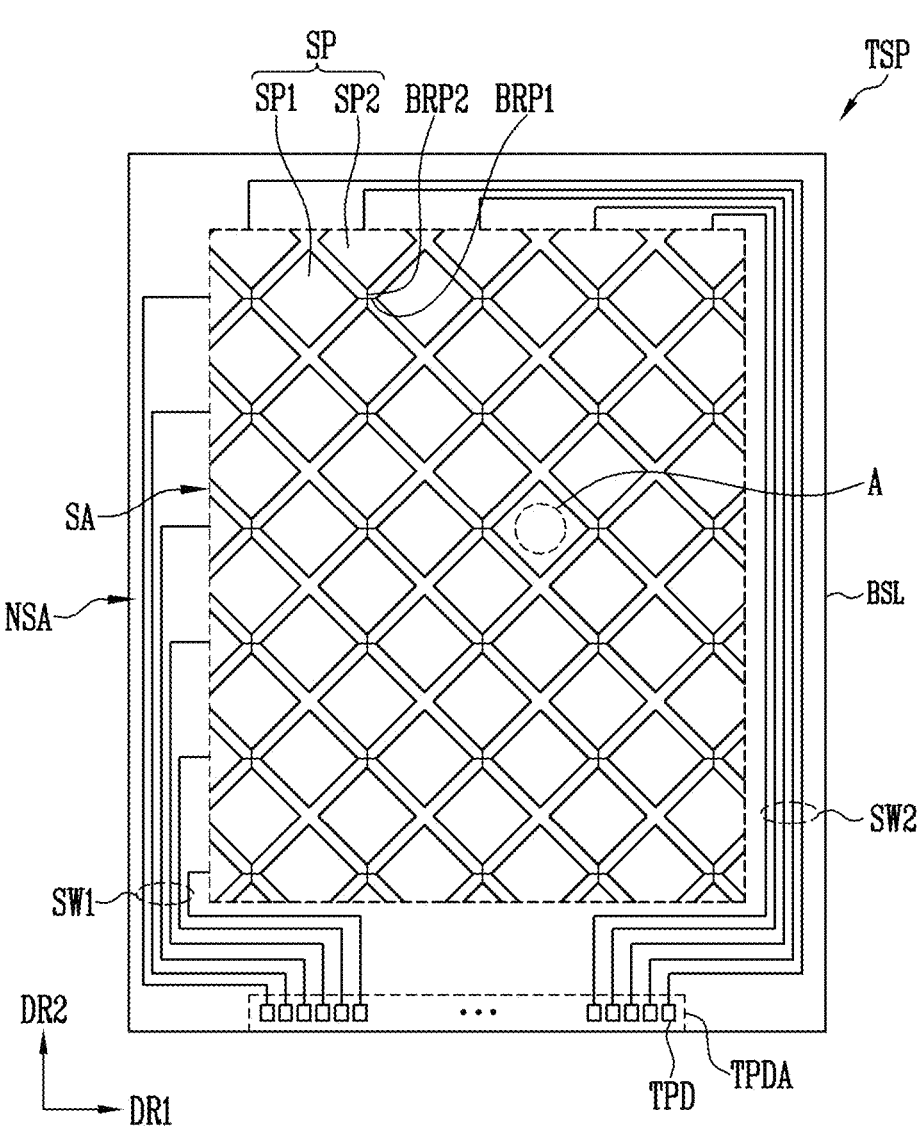
FIG. 8 is a plan view showing an embodiment of a sensing panel of the display device of FIG. 1.

According to an embodiment, the first and second conductive layers CPL1 and CPL2 may include sensing patterns SP (see FIG. 8) and sensing lines SW1 and SW2 (see FIG. 8).

Each of the second and third insulating layers INS2 and INS3 may include an inorganic insulating layer containing an inorganic material or an organic insulating layer containing an organic material. The inorganic material may include at least one of a metal oxide such as silicon nitride (SiNx), silicon oxide (SiOx), silicon oxynitride (SiON), or aluminum oxide (AlOx). The organic material may include at least one of an acryl-based resin, a methacryl-based resin, a polyisoprene, a vinyl-based resin, an epoxy-based resin, a urethane-based resin, a cellulose-based resin, siloxane-based resin, a polyimide-based resin, a polyamide-based resin, or a perylene-based resin.

The second insulating layer INS2 may be disposed on the first conductive layer CP1. The second insulating layer INS2 may include the same material as the first insulating layer INS1, but is not limited thereto. For example, the second insulating layer INS2 may include a low-temperature inorganic layer or a low-temperature organic layer.

The second conductive layer CPL2 may be disposed between the second insulating layer INS2 and the third insulating layer INS3.

The third insulating layer INS3 may be a passivation layer disposed and/or formed entirely on the second conductive layer CPL2. The third insulating layer INS3 may prevent the second conductive layer CPL2 from being exposed to the outside, and corrosion of the second conductive layer CPL2 may be inhibited or prevented.

Figure 5:
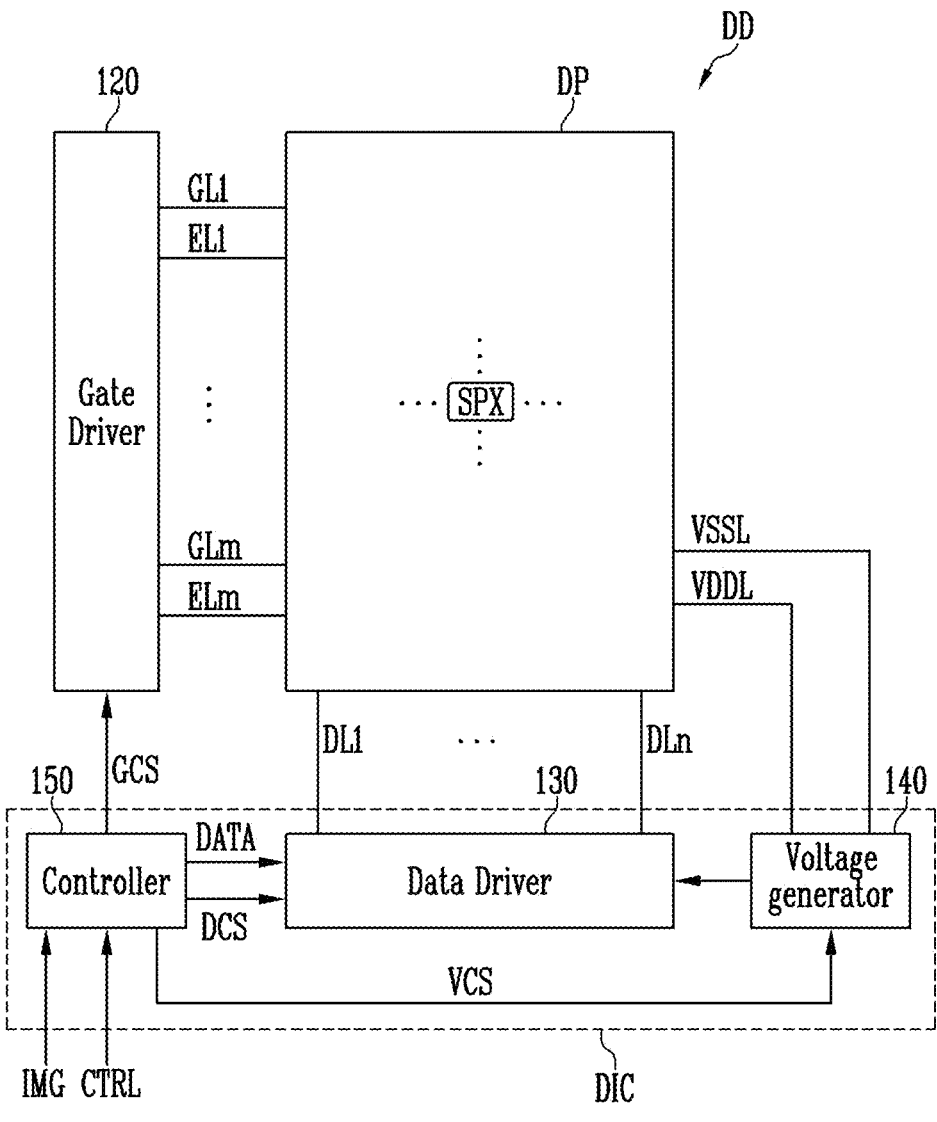
FIG. 5 is a block diagram showing an embodiment of the display device of FIG. 1.

FIG. 5 is a block diagram showing an embodiment of the display device of FIG. 1.

Referring to FIG. 5, the display device DD may include a display panel DP, a gate driver 120, a data driver 130, a voltage generator 140, and a controller 150.

The display panel DP may include sub-pixels SP. The sub-pixels SP may be connected to the gate driver 120 through the first to m-th gate lines GL1 to GLm. The sub-pixels SP may be connected to the data driver 130 through the first to n-th data lines DL1 to DLn.

Each of the sub-pixels SP may include at least one light emitting element configured to generate light. Each of the sub-pixels SP may generate light of a specific color. For example, a sub-pixel SP may generate light having a red color, a green color, a blue color, a cyan color, a magenta color, or a yellow color.

The gate driver 120 may be connected to the sub-pixels SP arranged in a row direction through the first to m-th gate lines GL1 to GLm. The gate driver 120 may output gate signals to the first to m-th gate lines GL1 to GLm in response to the gate control signal GCS. In some embodiments, the gate control signal GCS may include a start signal indicating the start of each frame, a horizontal synchronization signal for outputting gate signals in synchronization with the timing at which data signals are applied, etc.

In embodiments, first to m-th emission control lines EL1 to ELm connected to the sub-pixels SP in the row direction may be further provided. In this case, the gate driver 120 may include an emission control driver configured to control the first to m-th emission control lines EL1 to ELm, and the emission control driver may operate under the control of the controller 150.

The data driver 130 may be connected to the sub-pixels SP arranged in a column direction through the first to n-th data lines DL1 to DLn. The data driver 130 may receive image data DATA and data control signal DCS from the controller 150. The data driver 130 may operate in response to the data control signal DCS. In embodiments, the data control signal DCS may include a source start pulse, a source shift clock, or a source output enable signal. However, embodiments are not limited thereto.

The data driver 130 may apply data signals having grayscale voltages corresponding to the image data DATA to the first to n-th data lines DL1 to DLn using the voltages from the voltage generator 140. When a gate signal is applied to each of the first to m-th gate lines GL1 to GLm, data signals corresponding to the image data DATA may be applied to the data lines DL1 to DLn. Accordingly, the corresponding sub-pixels SP can generate light corresponding to data signals. Accordingly, an image may be displayed on the display panel DP.

In embodiments, the gate driver 120 and the data driver 130 may include complementary metal-oxide semiconductor (CMOS) circuit elements.

The voltage generator 140 may operate in response to a voltage control signal VCS from controller 150. The voltage generator 140 may be configured to generate a plurality of voltages and provide the generated voltages to components of the display device DD. For example, the voltage generator 140 may be configured to generate a plurality of voltages by receiving an input voltage from outside the display device DD, adjusting the received voltage, and regulating the adjusted voltage.

The voltage generator 140 may generate a first power voltage and a second power voltage. The first and second power voltages may be provided to the sub-pixels SP through the first and second power lines VDDL and VSSL, respectively. The first power voltage may have a relatively high voltage level, and the second power voltage may have a voltage level lower than the first power voltage VDD. In other embodiments, the first power voltage or the second power voltage may be provided by an external device of the display device DD.

In addition, the voltage generator 140 can generate various voltages. For example, the voltage generator 140 may generate an initialization voltage applied to the sub-pixels SP. For example, during a sensing operation to sense electrical characteristics of the transistors and/or light emitting element(s) of the plurality of sub-pixels SP, a predetermined reference voltage may be applied to the first to n-th data lines DL1 to DLn, and the voltage generator 140 may generate such a reference voltage.

The controller 150 may control various operations of the display device DD. The controller 150 may receive input image data IMG and a control signal CTRL from the outside. The controller 150 may provide a gate control signal GCS, a data control signal DCS, and a voltage control signal VCS in response to the control signal CTRL.

The controller 150 may convert the input image data IMG to suit the display device DD or the display panel DP, and may output image data DATA. In embodiments, the controller 150 may output image data DATA by aligning the input image data IMG to suit the sub-pixels SP in units of row.

Two or more components of the data driver 130, voltage generator 140, or controller 150 may be mounted on an integrated circuit. As shown in FIG. 5, the data driver 130, voltage generator 140, and controller 150 may be included in a driver integrated circuit DIC. In this case, the data driver 130, voltage generator 140, and controller 150 may be functionally separate components within a driver integrated circuit DIC. In other embodiments, at least one of the data driver 130, the voltage generator 140, or the controller 150 may be provided as a separate component from the driver integrated circuit DIC.

Figure 6:
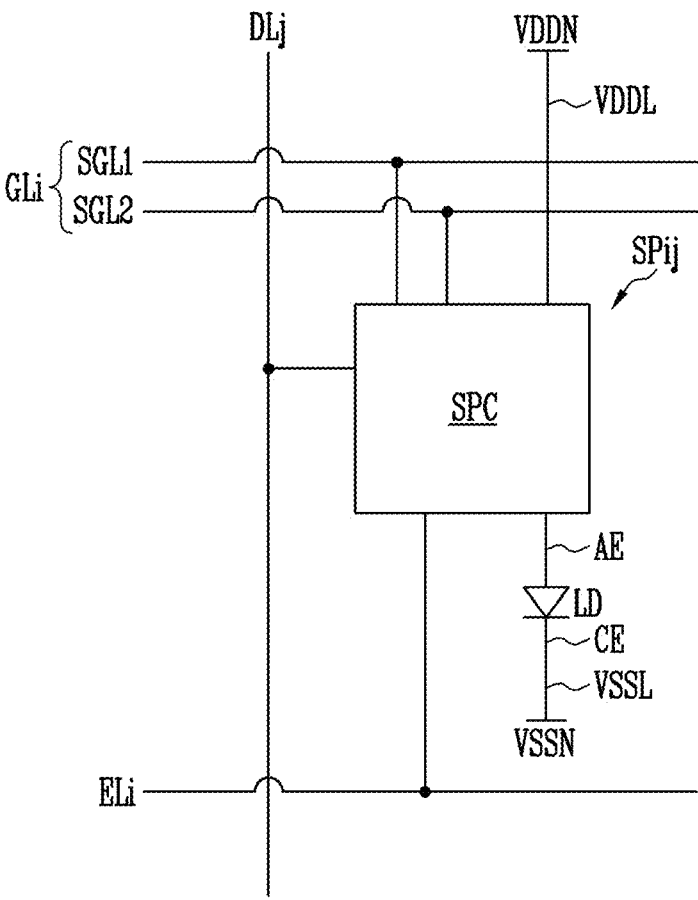
FIG. 6 is a circuit diagram showing an embodiment of a sub-pixel included in the display device of FIG. 1.

FIG. 6 is a circuit diagram showing an embodiment of a sub-pixel included in the display device of FIG. 1.

In FIG. 6, a sub-pixel SPij arranged in the i-th row and the j-th column among the sub-pixels SP of FIG. 5, may be shown as an example. Here, i may be an integer greater than or equal to 1 and less than or equal to m, and j may be an integer greater than or equal to 1 and less than or equal to n.

Referring to FIG. 6, the sub-pixel SPij may include a sub-pixel circuit SPC and a light emitting element LD.

The light emitting element LD may be connected between the first power voltage node VDDN and the second power voltage node VSSN. The first power voltage node VDDN may be connected to the first power line VDDL and receive the first power voltage. The second power voltage node VSSN may be connected to the second power line VSSL and receive the second power voltage. The first power voltage may have a higher voltage level than the second power voltage.

The light emitting element LD may be connected between the anode electrode AE and the cathode electrode CE. The anode electrode AE may be connected to the first power voltage node VDDN through the sub-pixel circuit SPC. For example, the anode electrode AE may be connected to the first power voltage node VDDN through one or more transistors included in the sub-pixel circuit SPC. The cathode electrode CE may be connected to the second power voltage node VSSN. The light emitting element LD may be configured to emit light depending on the current flowing from the anode electrode AE to the cathode electrode CE.

The sub-pixel circuit SPC may be connected to the i-th gate line GLi among the first to m-th gate lines GL1 to GLm of FIG. 5 and the j-th data line DLj among the first to n-th data lines DL1 to DLn of FIG. 5. In response to the gate signal received through the i-th gate line GLi, the sub-pixel circuit SPC may control the light emitting element LD to emit light depending on the data signal received through the j-th data line DLj. In embodiments, the sub-pixel circuit SPC may be further connected to the pixel control lines of FIG. 5. In this case, the sub-pixel circuit SPC may control the light emitting element LD in response to pixel control signals received through the pixel control lines.

For these operations, the sub-pixel circuit SPC may include circuit elements, such as transistors and one or more capacitors.

The transistors of the sub-pixel circuit SPC may include P-type transistors and/or N-type transistors. In embodiments, transistors of the sub-pixel circuit SPC may include a metal oxide silicon field effect transistor (MOSFET). In embodiments, transistors of the sub-pixel circuit SPC may include an amorphous silicon semiconductor, a monocrystalline silicon semiconductor, a polycrystalline silicon semiconductor, or an oxide semiconductor. However, embodiments are not limited thereto.

Figure 7:
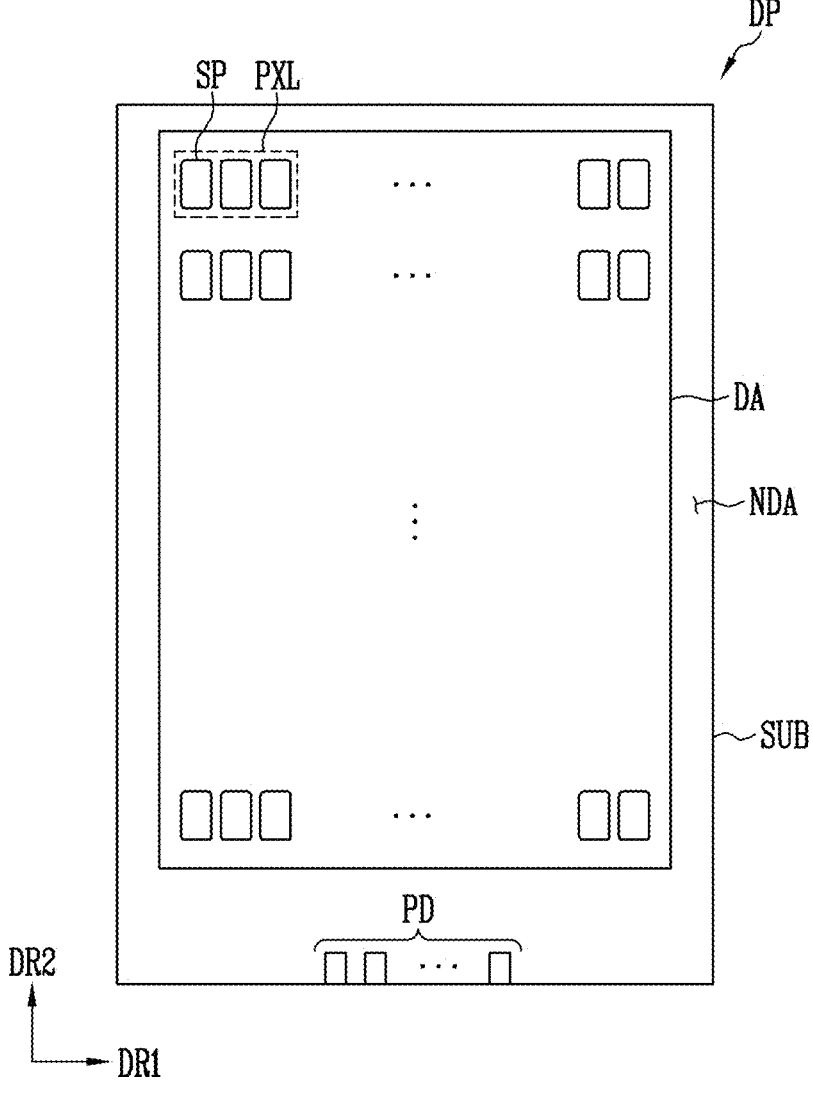
FIG. 7 is a plan view showing an embodiment of a display panel of the display device of FIG. 1.

FIG. 7 is a plan view showing an embodiment of a display panel of the display device of FIG. 1.

Referring to FIG. 7, the display panel DP may include a display area DA and a non-display area NDA. The display panel DP may display an image through an operation of the display area DA. The non-display area NDA may be disposed around at least a portion of the display area DA.

The display panel DP may include a substrate SUB, sub-pixels SPSP, and pads PD.

The sub-pixels SP may be disposed in the display area DA on the substrate SUB. The sub-pixels SP may be arranged in a matrix form along the first direction DR1 and/or the second direction DR2 that intersects the first direction DR1. However, embodiments are not limited thereto. For example, the sub-pixels SP may be arranged in a zigzag shape along the first direction DR1 and the second direction DR2. For example, the sub-pixels SP may be arranged in a PEN-TILE® shape.

Two or more sub-pixels among the plurality of sub-pixels SP may constitute a pixel PXL. For example, three sub-pixels may constitute a pixel PXL.

Components for controlling the sub-pixels SP may be disposed in the non-display area NDA on the substrate SUB. For example, the lines connected to the sub-pixels SP such as the first to m-th gate lines GL1 to GLm and the first to n-th data lines DL1 to DLn in FIG. 5 may be disposed in the non-display area NDA.

At least one of the gate driver 120, data driver 130, voltage generator 140, or controller 150 of FIG. 5 may be integrated in the non-display area NDA of the display panel DP. In embodiments, the gate driver 120 of FIG. 5 may be mounted on the display panel DP and may be disposed in the non-display area NDA. In other embodiments, the gate driver 120 may be implemented as an integrated circuit separate from the display panel DP.

The pads PD may be disposed in the non-display area NDA on the substrate SUB. The pads PD may be electrically connected to the sub-pixels SP through lines. For example, the pads PD may be connected to the sub-pixels SP through the first to n-th data lines DL1 to DLn.

The pads PD may interface the display panel DP to other components of the display device DD (see FIG. 1). In embodiments, voltages and signals for the operation of components included in the display panel DP may be provided from the driver integrated circuit DIC of FIG. 5 through the pads PD. For example, the first to n-th data lines DL1 to DLn may be connected to the driver integrated circuit DIC through the pads PD. For example, the first and second power voltages VDD and VSS may be received from the driver integrated circuit DIC through the pads PD. For example, when the gate driver 120 is mounted on the display panel DP, the gate control signal GCS may be transmitted from the driver integrated circuit DIC to the gate driver 120 through the pads PD.

In embodiments, the circuit board may be electrically connected to the pads PD using a conductive adhesive member such as an anisotropic conductive film. The circuit board may be a flexible circuit board (FPCB) or a flexible film made of a flexible material. The driver integrated circuit DIC may be mounted on the circuit board and electrically connected to the pads PD.

In embodiments, the display area DA may have various shapes. The display area DA may have a closed loop shape including straight and/or curved sides. For example, the display area DA may have shapes such as a polygon, circle, semicircle, or ellipse.

In embodiments, the display panel DP may have a flat display surface. In other embodiments, the display panel DP may have a display surface that is at least partially round. In embodiments, the display panel DP may be bendable, foldable, or rollable. In these cases, the display panel DP and/or the substrate SUB may include materials with flexible properties.

FIG. 8 is a plan view showing an embodiment of a sensing panel of the display device of FIG. 1.

Referring to FIG. 8, the sensing panel TSP may include a base layer BSL including a sensor area SA (or sensing area, active area) or a non-sensor area NSA (or non-sensing area).

The base layer BSL may be formed of reinforced glass, transparent plastic, or transparent film.

The sensor area SA may be provided in a central portion of the base layer BSL to overlap the display area DA (see FIG. 1). The sensor area SA may have a shape substantially the same as that of the display area DA, but is not limited thereto. The sensor area SA may sense the touch input.

Sensor electrodes for sensing the touch input may be provided and/or formed in the sensor area SA.

The non-sensor area NSA may be provided in a peripheral area of the base layer BSL to overlap the non-display area NDA (see FIG. 1). Here, the peripheral area may be an area surrounding the central portion of the base layer BSL. Sensing lines SW1 and SW2 may be electrically connected to sensor electrodes to receive and transmit sensing signals, and may be provided and/or formed in the non-sensing area NSA. Additionally, a touch pad area TPDA may be disposed in the non-sensor area NSA. The touch pad area TPDA may be connected to the sensing lines SW1 and SW2 and may be electrically connected to the sensor electrodes of the sensor area SA. The touch pad area TPDA may include a touch pad TPD. The sensing lines SW1 and SW2 may include a plurality of first sensing lines SW1 and a plurality of second sensing lines SW2.

The sensor electrodes may include a plurality of sensing patterns SP and first and second bridge patterns BRP1 and BRP2.

The sensing patterns SP may include a plurality of first sensing patterns SP1 and a plurality of second sensing patterns SP2. The first sensing patterns SP1 and the plurality of second sensing patterns SP2 may be electrically insulated from each other.

The first sensing patterns SP1 may be arranged in the first direction DR1 and may be electrically connected to the adjacent first sensing patterns SP1 through the first bridge pattern BRP1 to form at least one sensor row. The second sensing patterns SP2 may be arranged in the second direction DR2 crossing the first direction DR1 and may be electrically connected to the adjacent second sensing patterns SP2 through the second bridge pattern BRP2 to form at least one sensor column.

The first and second sensing patterns SP1 and SP2 may be electrically connected to the touch pads TPD through corresponding sensing lines. For example, the first sensing patterns SP1 may be electrically connected to the touch pads TPD through the first sensing lines SW1, and the second sensing patterns SP2 may be electrically connected to the touch pads TPD through the second sensing lines SW2.

The first sensing patterns SP1 may be driving electrodes that receive a driving signal for sensing a touch position within the sensor area SA, and the second sensing patterns SP2 may be sensing electrodes that output a sensing signal for sensing the touch position within the sensor area SA. However, it is not limited thereto. For example, the first sensing patterns SP1 may be a sensing electrode, and the second sensing patterns SP2 may be a driving electrode.

According to an embodiment, the sensing panel TSP may recognize the user's touch by sensing a change in mutual capacitance formed between the first and second sensing patterns SP1 and SP2.

Figure 9:
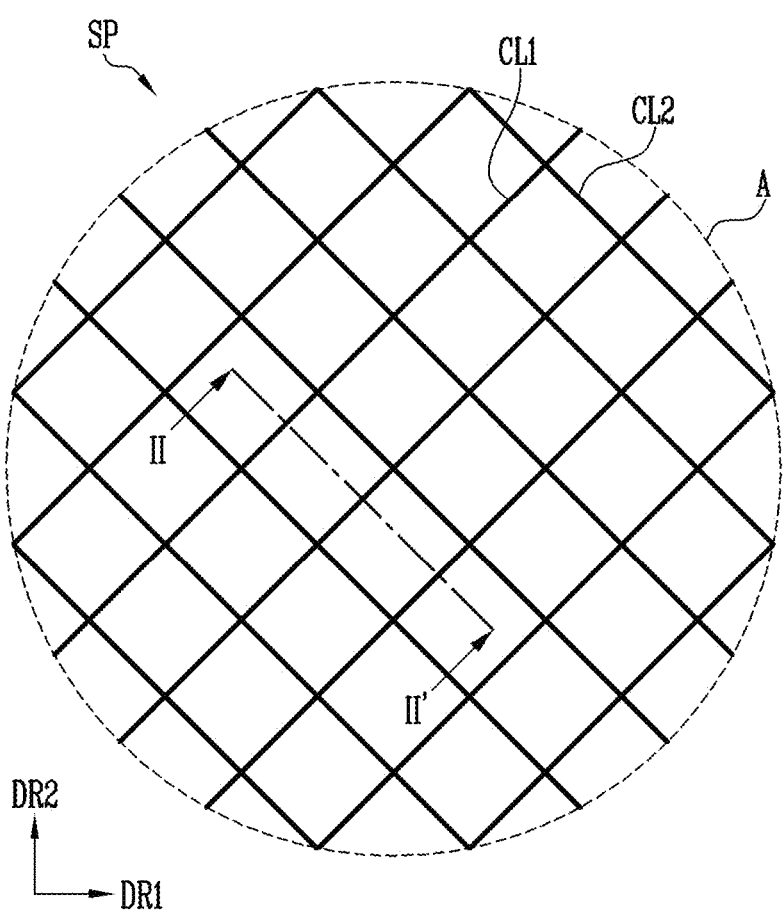
FIG. 9 is an enlarged view showing an embodiment of part A of FIG. 8.

FIG. 9 is an enlarged view showing an embodiment of part A of FIG. 8.

Referring to FIG. 9, the sensing patterns SP (see FIG. 8) may include a plurality of conductive lines CL1 and CL2. For example, the sensing patterns SP may include a plurality of first conductive lines CL1 that extend in a diagonal direction between the first direction DR1 and the second direction DR2 and may be disposed parallel to each other. The sensing patterns SP may include a plurality of second conductive lines CL2 that extend in a diagonal direction between the first direction DR1 and the second direction DR2 and may be disposed parallel to each other. Due to the first conductive lines CL1 and the second conductive lines CL2, each of the sensing patterns SP may have a mesh structure. The mesh structure may include a plurality of openings, for example, areas formed by the intersection of the first conductive lines CL1 and the second conductive lines CL2.

In the drawing, each of the sensing patterns SP is shown as having a mesh structure, however, the present disclosure is not limited thereto. For example, the sensing patterns SP (see FIG. 8), the first and second bridge patterns BRP1 and BRP2 (see FIG. 8), and the first and second conductive lines CL1 and CL2 may have the mesh structure.

For example, the first and second conductive lines CL1 and CL2 may have a multilayer structure of titanium (Ti)/ aluminum (Al)/titanium (Ti). In this case, the sensing sensitivity of the first and second conductive lines CL1 and CL2 can be increased by increasing a line width or line thickness thereof. This increase in line width or line thickness may lower an aperture ratio and increase reflectance of external light in the side surface. Accordingly, the first and second conductive lines CL1 and CL2 may have a multilayer structure of titanium (Ti)/copper (Cu).

Figure 10:
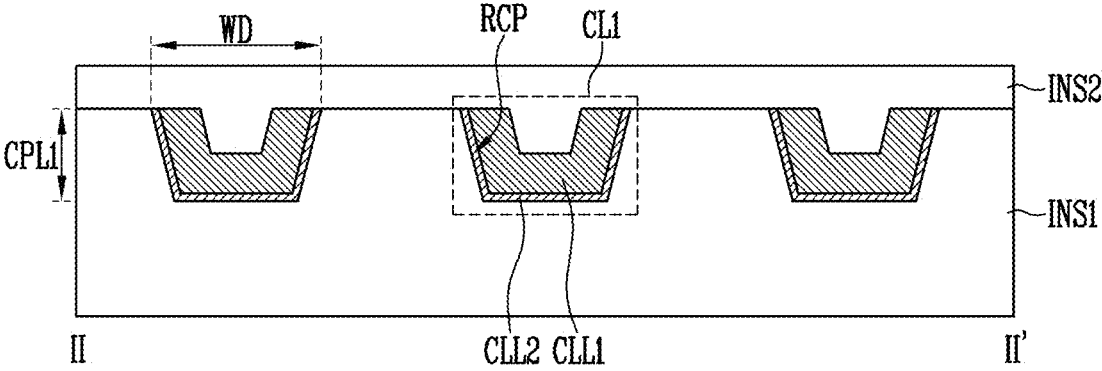
FIG. 10 and FIG. 11 are cross-sectional views taken along a line II-II' of FIG. 8.
Figure 11:
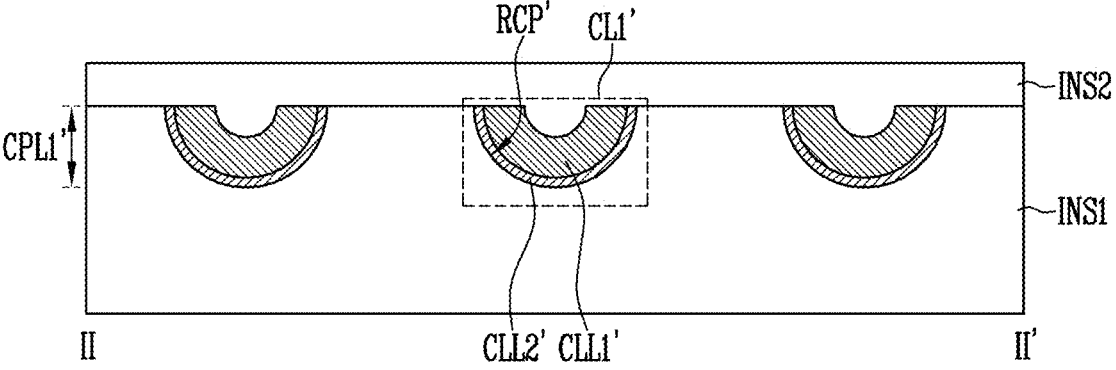

FIG. 10 and FIG. 11 are cross-sectional views taken along a line II-II' of FIG. 8.

Referring to FIG. 9 and FIG. 10, the sensing panel TSP may include a first insulating layer INS1, a first conductive layer CPL1, and a second insulating layer INS2. Additionally, the first conductive layer CPL1 may include first conductive lines CL1.

The first conductive lines CL1 and the second conductive lines CL2 may be disposed on the first insulating layer INS1. The first conductive lines CL1 and the second conductive lines CL2 may be arranged to form a sensing pattern SP. Additionally, a second insulating layer INS2 may be disposed on the first conductive lines CL1 and the second conductive lines CL2.

The first conductive lines CL1 may be described as an example. For example, the second conductive lines CL2 may be configured similarly to the first conductive lines CL1. A duplicative description of the second conductive lines CL2 may be omitted or simplified.

For example, the first insulating layer INS1 may have a recess portion RCP on a surface facing the second insulating layer INS2. The recess portions RCP may be spaced apart from each other. Additionally, the recess portion RCP may have a constant width WD. The recess portion RCP may have a polygonal shape when viewed in cross section. For example, the recess portion RCP may have an inverted trapezoidal shape with a bottom surface having a width that is less than a width of a top surface when viewed in cross section. However, the cross-sectional shape of the recess portion RCP is not limited thereto. For example, the recess portion RCP may have a rectangular shape with the lower and top surfaces having the same width.

The first conductive lines CL1 and second conductive lines CL2 may be provided within the recess portion RCP. The first and second conductive lines CL1 and CL2 may have a second line layer CLL2 as a lower layer and a first line layer CLL1 as an upper layer.

The first line layer CLL1 may be disposed between the first insulating layer INS1 and the second insulating layer INS2 within the recess portion RCP. The first line layer CLL1 may be a layer patterned to overlap the recess portion RCP. The first line layer CLL1 may be distributed with a uniform thickness along the inner surfaces of the recess portion RCP.

The first line layer CCL1 may include a low-resistance metal. For example, the first line layer CCL1 may include copper (Cu) with low resistance. However, the low-resistance metal is not limited to copper (Cu) as long as it has a resistance value lower than that of copper (Cu).

The second line layer CLL2 may be disposed between the first insulating layer INS1 and the first line layer CLL1. The second line layer CLL2 may be disposed to be in contact with the side surfaces within the recess portion RCP. The second line layer CLL2 may be a layer patterned to overlap the recess portions RCP. The thickness of the second line layer CLL2 may be formed to be thinner than the thickness of the first line layer CLL1. The second line layer CLL2 may be formed of a layer containing titanium (Ti). However, titanium (Ti) is described as an example thereof, but is not limited thereto. For example, the second line layer CLL2 may include aluminum (AL). In this way, by providing the first and second conductive lines CL1 and CL2 within the recess portion RCP, the reflection of external light can be reduced. Further, a phenomenon in which reflected external light may take a reddish hue that may be visible to the user may be reduced.

In an embodiment of FIG. 11, description of content that overlaps the content described with reference to FIG. 10 will be omitted, and description will focus on differences.

Referring to FIG. 9 and FIG. 11, the recess portion RCP' of the first insulating layer INS1' may have a rounded shape. For example, the recess portion RCP' of the first insulating layer INS1' may have a semicircular shape when viewed in cross section. However, the cross-sectional shape of the recess portion RCP' is not limited thereto. For example, the recess portion RCP' may have a semi-elliptical shape.

Figure 12:
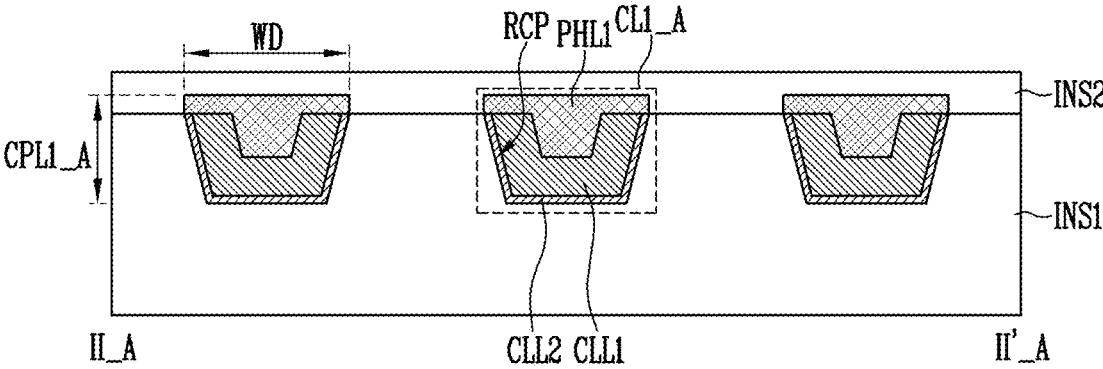
FIG. 12, FIG. 13, and FIG. 14 are cross-sectional views showing other embodiments taken along a line II-II' of FIG. 8.
Figure 13:
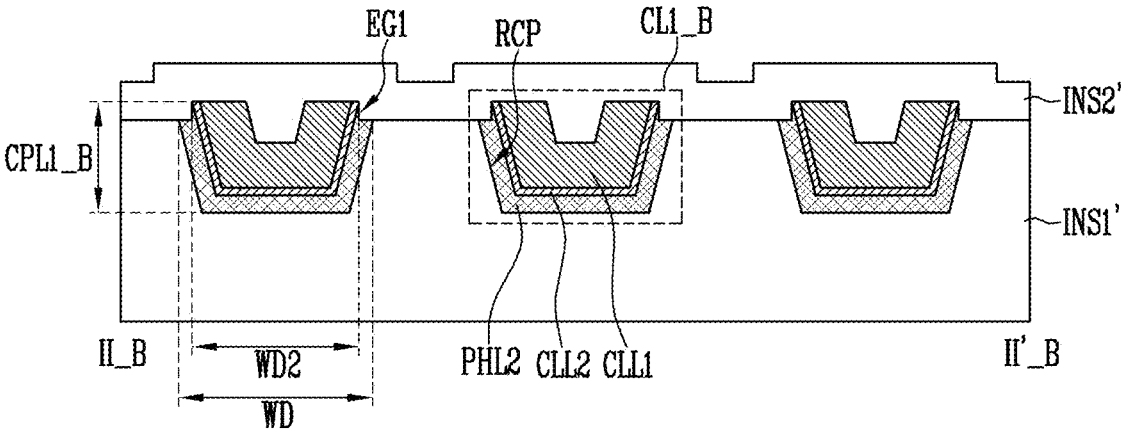
Figure 14:
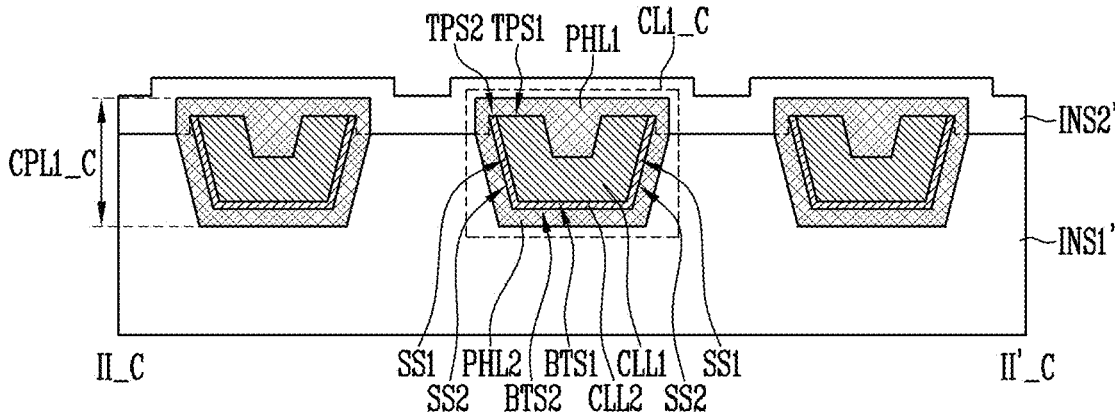

FIG. 12, FIG. 13, and FIG. 14 are cross-sectional views showing other embodiments taken along a line II-II' of FIG. 8. Referring to FIGS. 12 to 14, the conductive lines may include a light blocking layer. The description of content that overlaps the content described with reference to FIG. 10 will be omitted, and the description will focus on differences.

Referring to FIG. 9 and FIG. 12, the sensing panel TSP may include a first insulating layer INS1, a first conductive layer CPL1_A, and a second insulating layer INS2. According to an embodiment, the first conductive lines CL1_A of the first conductive layer CPL1_A may include the first line layer CCL1, the second line layer CCL2, and the light blocking layer overlapping the first and second line layers CCL1 and CCL2. Here, the light blocking layer may be the first sub-light blocking layer PHL1 disposed between the first line layer CCL1 and the second insulating layer INS2. For example, at least a portion of the first sub-light blocking layer PHL1 may be disposed on the first and second line layers CCL1 and CCL2 within the recess portion RCP. The remaining portion of the first sub-light blocking layer PHL1 may be arranged to overlap the recess portion RCP on a surface facing the second insulating layer INS2 among the first and second line layers CCL1 and CCL2.

The recess portions RCP may be disposed to be spaced apart from each other. Portions of the first sub-light blocking layer PHL1 may be disposed to be spaced apart from each other. In a case that the first sub-light blocking layer PHL1 is arranged to overlap the recess portion RCP, the portions of the first sub-light blocking layer PHL1 may have the same width WD as the recess portion RCP.

The first sub-light blocking layer PHL1 may include a colored metal material or a light blocking material. Here, the light blocking material may be substantially the same material as the black matrix. For example, the first sub-light blocking layer PHL1 may include metals such as carbon black and chromium, or oxides thereof. The first sub-light blocking layer PHL1 may include black dye or black pigment. However, embodiments are not limited thereto.

Referring to FIG. 9 and FIG. 13, the sensing panel TSP may include a first insulating layer INS1', a first conductive layer CPL1_B, and a second insulating layer INS2'. According to an embodiment, the first conductive lines CL1_B of the first conductive layer CPL1_B may include the first line layer CCL1, the second line layer CCL2, and the light blocking layer overlapping the first and second line layers CCL1 and CCL2. Here, the light blocking layer may be a second sub-light blocking layer PHL2 disposed between the second line layer CCL2 and the first insulating layer INS1'. For example, the second sub-light blocking layer PHL2 may be disposed between the second line layer CCL2 and the recess portion RCP of the first insulating layer INS1' and surround partially the second line layer CCL2. The second sub-light blocking layer PHL2 may be disposed within the recess portion RCP together with the first and second line layers CCL1 and CCL2.

The second sub-light blocking layer PHL2 may be disposed to be in contact with the side surfaces within the recess portion RCP. The second sub-light blocking layer PHL2 may have the same width WD as the recess portion RCP within the recess portion RCP. The width WD2 of the second line layers CCL2 arranged to face inner sides of the recess portion RCP with the second sub-light blocking layer PHL2 disposed therebetween, may be narrower than the width WD of the recess portion RCP. For example, the second line layer CCL2 may be patterned using isotropic etching, for example, wet etching. The second sub-light blocking layer PHL2 may be patterned using anisotropic etching, for example, dry etching.

By etching the second sub-light blocking layer PHL2 in the vertical direction through anisotropic etching, at least a portion of the first and second line layers CCL1 and CCL2 may protrude from a surface of the first insulating layer INS1'. Additionally, at least a portion of the second sub-light blocking layer PHL2 may surround the protruding side surfaces EG1 of the first and second line layers CCL1 and CCL2. As at least a portion of the first and second line layers CCL1 and CCL2 may be formed to protrude above a surface of the first insulating layer INS1', at least a portion of the second insulating layer INS2' may be protruded corresponding to the first and second line layers CCL1 and CCL2. For example, the second insulating layer INS2' may be a conformal layer. For example, the second insulating layer INS2' may have a pattern on an upper surface thereof corresponding to protrusions of the first and second line layers CCL1 and CCL2.

The second sub-light blocking layer PHL2 may include a colored metal material or a light blocking material. Here, the light blocking material may be substantially the same material as the black matrix. For example, the second sub-light blocking layer PHL2 may include metals such as carbon black and chromium, or oxides thereof. The second sub-light blocking layer PHL2 may include black dye, black pigment, etc. The second sub-light blocking layer PHL2 may be made of the same material as or a different material from the first sub-light blocking layer PHL1.

Referring to FIGS. 9 and 14, the sensing panel TSP may include a first insulating layer INS1', a first conductive layer CPL1_C, and a second insulating layer INS2'. According to an embodiment, the first conductive lines CL1_C of the first conductive layer CPL1_C may include the first line layer CCL1, the second line layer CCL2, and a light blocking layer overlapping the first and second line layers CCL1 and CCL2. Here, the light blocking layer may include a first sub-light blocking layer PHL1 and a second sub-light blocking layer PHL2. For example, the first and second sub-light blocking layers PHL1 and PHL2 may entirely surround the first and second line layers CCL1 and CCL2. For example, the first line layer CCL1 may have a bottom surface BTS1 adjacent to the first insulating layer INS1', a top surface TPS1 opposite to the bottom surface BTS1 and adjacent to the second insulating layer INS2', and first and second side surfaces SS1 connecting the bottom surface BTS1 and the top surface TPS1. In addition, the second line layer CCL2 may have a top surface TPS2 adjacent to the second insulating layer INS2', a bottom surface BTS2 opposite to the bottom surface BTS1 of the first line layer CCL1, and side surfaces SS2 opposite to the side surfaces SS1 of the first line layer CCL1. In this case, the first and second sub-light blocking layers PHL1 and PHL2 may surround the top surface TPS2, the bottom surface BTS2, and the side surfaces SS2 of the second line layer CCL2, and the top surface TPS1 of the first line layer CCL1.

The first sub-light blocking layer PHL1 may be configured similarly to the first sub-light blocking layer PHL1 of FIG. 12. Additionally, the second sub-light blocking layer PHL2 may be configured similarly to the second sub-light blocking layer PHL2 of FIG. 13.

As such, the first and second conductive lines CL1 and CL2 may further include first and second sub-light blocking layers PHL1 and PHL2, and a reflection of external light may be reduced and visibility may be improved. For example, at least a portion of the first and second line layers CCL1 and CCL2 may be surrounded by the first and second sub-light blocking layers PHL1 and PHL2 that partially absorb external light. Accordingly, the first and second conductive lines CL1 and CL2 can reduce the reflectance of external light incident on the sensing panel TSP from the outside.

Figure 15:
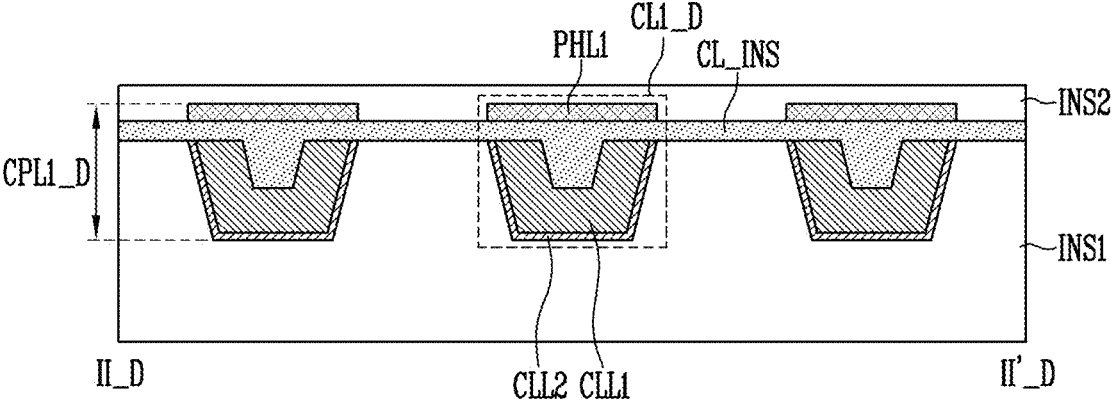
FIG. 15, FIG. 16, and FIG. 17 are cross-sectional views showing another embodiment along a line II-II' of FIG. 8.
Figure 16:
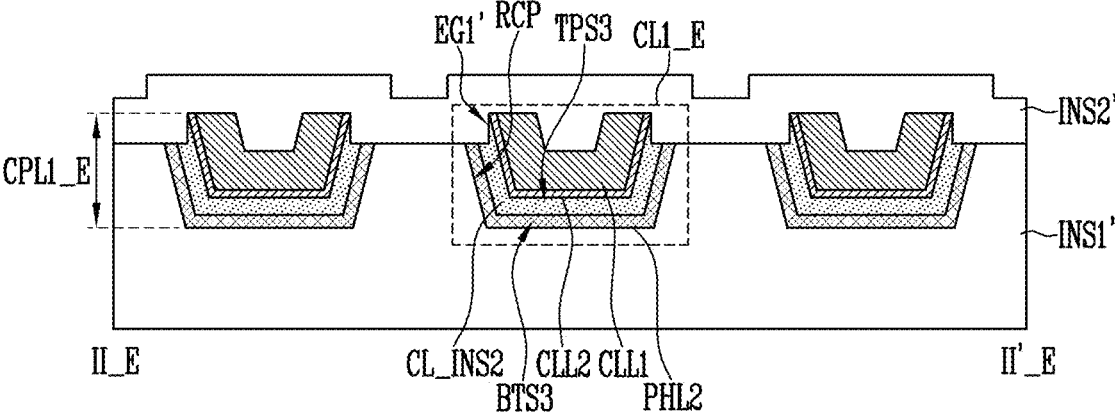
Figure 17:
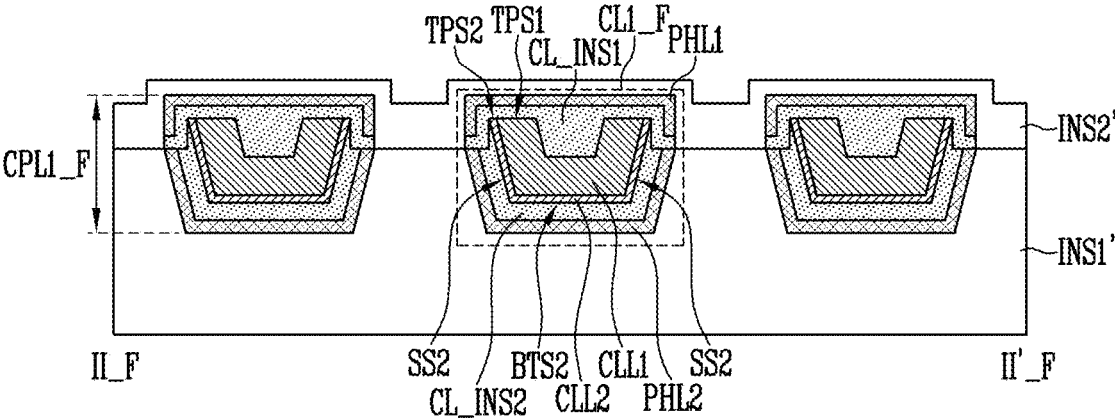

FIGS. 15 to 17 are cross-sectional views showing another embodiment along a line II-II' of FIG. 8.

Referring to FIGS. 15 to 17, the conductive lines may include an auxiliary insulating layer. The description of content that overlaps the content described with reference to FIG. 10 and FIGS. 12 to 14 may be omitted or simplified.

Referring to FIG. 9 and FIG. 15, the sensing panel TSP may include a first insulating layer INS1, a first conductive layer CPL1_D, and a second insulating layer INS2. According to an embodiment, the first conductive lines CL1_D of the first conductive layer CPL1_D may include the first line layer CCL1, the second line layer CCL2, and the first sub-light blocking layer PHL1 overlapping the first and second line layers CCL1 and CCL2. Additionally, the sensing panel TSP may further include an auxiliary insulating layer CL_INS between the first insulating layer INS1 and the second insulating layer INS2.

For example, the auxiliary insulating layer CL_INS may be disposed as a single layer between the first insulating layer INS1 and the second insulating layer INS2. For example, at least a portion of the auxiliary insulating layer CL_INS may overlap the recess portion RCP, and the remaining portion of the auxiliary insulating layer CL_INS may not overlap the recess portion RCP. At least a portion of the auxiliary insulating layer CL_INS overlapping the recess portion RCP may be disposed between the first line layer CCL1 and the first sub-light blocking layer PHL1. The remaining portion of the auxiliary insulating layer CL_INS that does not overlap the recess portion RCP may be disposed between the first insulating layer INS1 and the second insulating layer INS2.

The auxiliary insulating layer CL_INS may include an inorganic insulating layer containing an inorganic material or an organic insulating layer containing an organic material.

For example, the inorganic material may include at least one of metal oxides such as silicon nitride (SiNx), silicon oxide (SiOx), silicon oxynitride (SiON), or aluminum oxide (AlOx). The organic material may include at least one of an acryl-based resin, a methacryl-based resin, a polyisoprene, a vinyl-based resin, an epoxy-based resin, a urethane-based resin, a cellulose-based resin, siloxane-based resin, a poly-imide-based resin, a polyamide-based resin, or a perylene-based resin.

The first sub-light blocking layer PHL1 may be disposed to overlap the recess portion RCP on a surface of the auxiliary insulating layer CL_INS facing the second insulating layer INS2. Corresponding to the recess portions RCP disposed to be spaced apart from each other, the first sub-light blocking layer PHL1 may be disposed to be spaced apart from each other.

Referring to FIGS. 9 and 16, the sensing panel TSP may include a first insulating layer INS1', a first conductive layer CPL1_E, and a second insulating layer INS2'. According to an embodiment, the first conductive lines CL1_E of the first conductive layer CPL1_E may include the first line layer CCL1, the second line layer CCL2, and the second sub-light blocking layer PHL2 disposed between the second line layer CCL2 and the first insulating layer INS1'. Additionally, the first conductive lines CL1_E of the first conductive layer CPL1_E may further include an auxiliary insulating layer. Here, the auxiliary insulating layer may be a second sub-auxiliary insulating layer CL_INS2 disposed between the second sub-light blocking layer PHL2 and the second line layer CCL2. For example, the second sub-auxiliary insulating layer CL_INS2 may be disposed between the second sub-light blocking layer PHL2 and the second line layer CCL2 to partially surround the second line layer CCL2. A bottom surface BTS3 of the second sub-auxiliary insulating layer CL_INS2 adjacent to the first insulating layer INS1' may be in contact with the second sub-light blocking layer PHL2, and an top surface TPS3 thereof adjacent to the second insulating layer INS2' may be in contact with the second line layer CCL2. The second sub-auxiliary insulating layer CL_INS2 may be disposed within the recess portion RCP together with the first and second line layers CCL1 and CCL2 and the second sub-light blocking layer PHL2.

The second sub-auxiliary insulating layer CL_INS2 and the second sub-light blocking layer PHL2 may be patterned using anisotropic etching, for example, dry etching. By etching the second sub-auxiliary insulating layer CL_INS2 in the vertical direction through anisotropic etching, at least a portion of the second sub-auxiliary insulating layer CL_INS2 may protrude from a surface of the first insulating layer INS1' together with the first and second line layers CCL1 and CCL2. Additionally, at least a portion of the second sub-auxiliary insulating layer CL_INS2 may surround the protruding side surfaces EG1' of the first and second line layers CCL1 and CCL2. At least a portion of the second insulating layer INS2' may protrude corresponding to the first and second line layers CCL1 and CCL2.

The second sub-auxiliary insulating layer CL_INS2 may include an inorganic insulating layer containing an inorganic material or an organic insulating layer containing an organic material. The second sub-auxiliary insulating layer CL_INS2 may include the same material as the auxiliary insulating layer CL_INS of FIG. 15.

Referring to FIGS. 9 and 17, the sensing panel TSP may include a first insulating layer INS1', a first conductive layer CPL1_F, and a second insulating layer INS2'. According to an embodiment, the first conductive lines CL1_F of the first conductive layer CPL1_F may include the first line layer CCL1, the second line layer CCL2, and the first and second sub-light blocking layers PHL1 and PHL2. The first conductive lines CL1_F of the first conductive layer CPL1_F may include an auxiliary insulating layer disposed between the first and second line layers CCL1 and CCL2 and the first and second sub-light blocking layers PHL1 and PHL2. Here, the auxiliary insulating layer may include a first sub-auxiliary insulating layer CL_INS1 and a second sub-auxiliary insulating layer CL_INS2. For example, the first and second sub-auxiliary insulating layers CL_INS1 and CL_INS2 may entirely surround the first and second line layers CCL1 and CCL2. The first sub-auxiliary insulating layer CL_INS1 may be disposed between the first line layer CCL1 and the first sub-light blocking layer PHL1. For example, the first sub-auxiliary insulating layer CL_INS1 may be disposed between the top surface TPS1 of the first line layer CCL1 and the first sub-light blocking layer PHL1. The second sub-auxiliary insulating layer CL_INS2 may be disposed between the bottom surface BTS2 of the second line layer CCL2 and the second sub-light blocking layer PHL2. In this case, the first and second sub-auxiliary insulating layers CL_INS1 and CL_INS2 may surround the top surface TPS2, the bottom surface BTS2, and the side surfaces SS2 of the second line layer CCL2, and the top surface TPS1 of the first line layer CCL1.

As such, the first and second conductive lines CL1 and CL2 may further include first and second sub-auxiliary insulating layers CL_INS1 and CL_INS2, and corrosion of the first and second conductive lines CL1 and CL2 may be inhibited or prevented. For example, the first and second sub-auxiliary insulating layers CL_INS1 and CL_INS2 may block at least a portion of the first line layer CCL1 from being exposed to the outside, and corrosion of the first and second conductive lines CL1 and CL2 may be inhibited or prevented.

FIGS. 18 to 24 are drawings for illustrating a manufacturing method of a display device according to an embodiment of the present disclosure.

Hereinafter, with reference to FIGS. 18 to 24, a manufacturing method of a display device including the sensing panel TSP (or touch sensor) described with reference to FIG. 10, FIG. 12, and FIG. 15 will be described. In describing FIGS. 18 to 24, descriptions of content that overlaps the content described with reference to FIG. 10, FIG. 12, and FIG. 15 may be omitted or simplified.

As shown in FIG. 3, a substrate SUB may be provided, and a pixel circuit layer PCL and a display element layer DPL may be formed on a surface of the substrate SUB. Thus, pixels PXL may be formed. A thin film encapsulation layer TFE may be formed on a surface where the pixels PXL may be formed. For example, the thin film encapsulation layer TFE may include a plurality of inorganic layers (not shown) and a plurality of organic layers (not shown).

Figure 18:
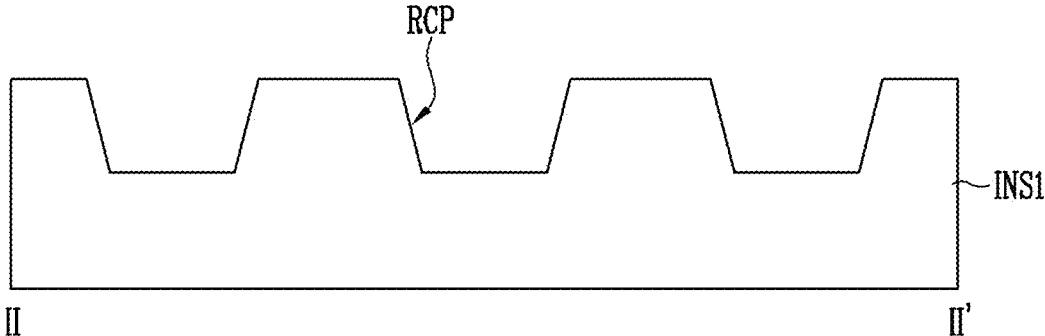
FIGS. 18 to 24 are drawings for illustrating a manufacturing method of a display device according to an embodiment of the present disclosure.

Referring to FIG. 18, the first insulating layer INS1 may be formed on the thin film encapsulation layer TFE (see FIG. 4). However, the present disclosure is not limited thereto. For example, the first insulating layer INS1 may be a thin film encapsulation layer TFE.

The recess portion RCP may be formed on a surface of the first insulating layer INS1 to be spaced apart from each other. For example, the first insulating layer INS1 may form the recess portion RCP through exposure and development.

In an embodiment, the first insulating layer INS1 may include a positive photoresist material on a surface. Here, the positive photoresist material may be a material that is dissolved by exposure, and the exposed portion of the positive photoresist material may be removed in the development process after the exposure process. For example, the recess portion RCP may be an exposed portion of the first insulating layer INS1.

In this way, as the recess portion RCP is formed by exposing and developing the first insulating layer INS1 including a positive photoresist material, the recess portion RCP may include a tapered inclined surface. However, although a positive photoresist material was described as an example, it is not limited thereto. For example, the recess portion RCP may be formed by exposing and developing the first insulating layer INS1 including a negative photoresist material.

Figure 19:
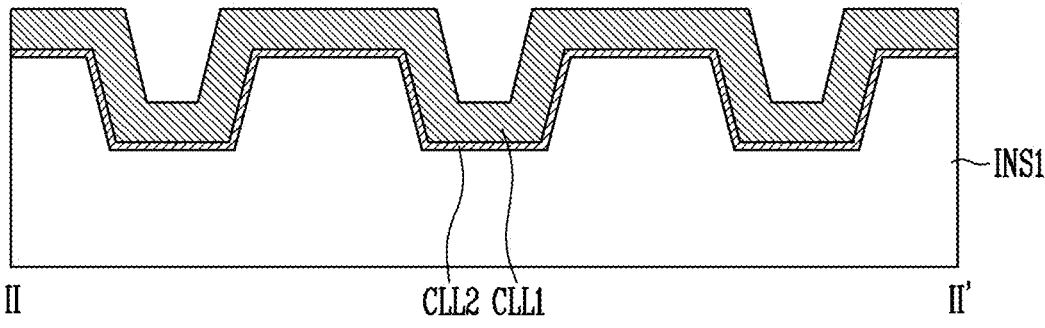

Referring to FIG. 19, the second line layer CCL2 may be formed to entirely cover a surface of the first insulating layer INS1 on which the recess portion RCP is formed. For example, the second line layer CCL2 may be formed by providing a first material on a surface of the first insulating layer INS1. For example, the first material may be titanium (Ti).

Additionally, the first line layer CCL1 may be formed to entirely cover the second line layer CCL2. For example, the first line layer CCL1 may be formed by providing a second material including a low-resistance metal on a surface of the second line layer CCL2 that does not face the first insulating layer INS1. For example, the second material may be copper (Cu). There is no limitation to the method of forming the first and second line layers CCL1 and CCL2, and various known methods may be used.

In this way, the second line layer CCL2 and the first line layer CCL1 may be sequentially stacked on a surface of the first insulating layer INS1 where the recess portion RCP is formed.

Figure 20:
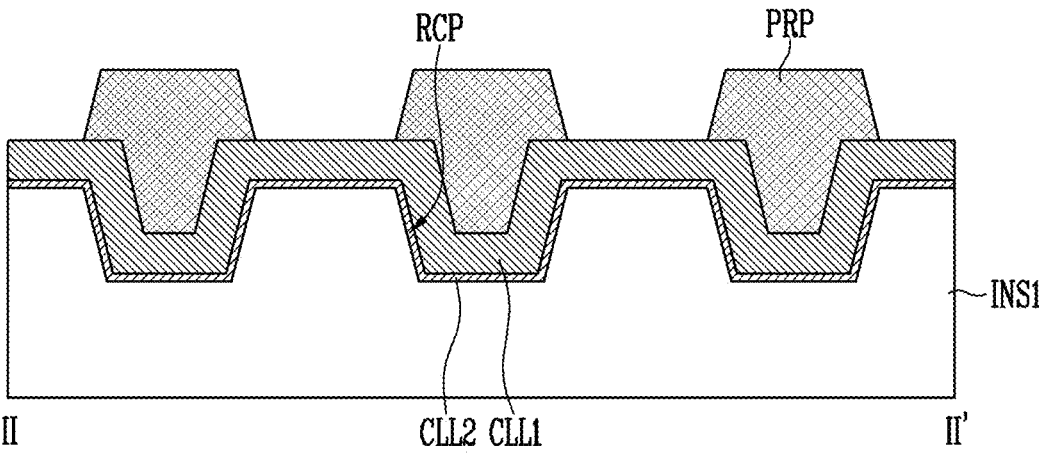

Referring to FIG. 20, a photoresist pattern PRP may be formed on the first line layer CCL1. The photoresist pattern PRP may be a structure remaining after exposure and development processes using a photo mask. The photoresist pattern PRP may be the same pattern as the photomask pattern.

According to an embodiment, the photoresist pattern PRP may be formed to overlap the recess portion RCP. The photoresist pattern PRP may partially cover a surface of the first line layer CCL1. For example, the photoresist pattern PRP may be filled to cover the recess portion RCP. Additionally, the photoresist pattern PRP may include a tapered inclined surface.

Figure 21:
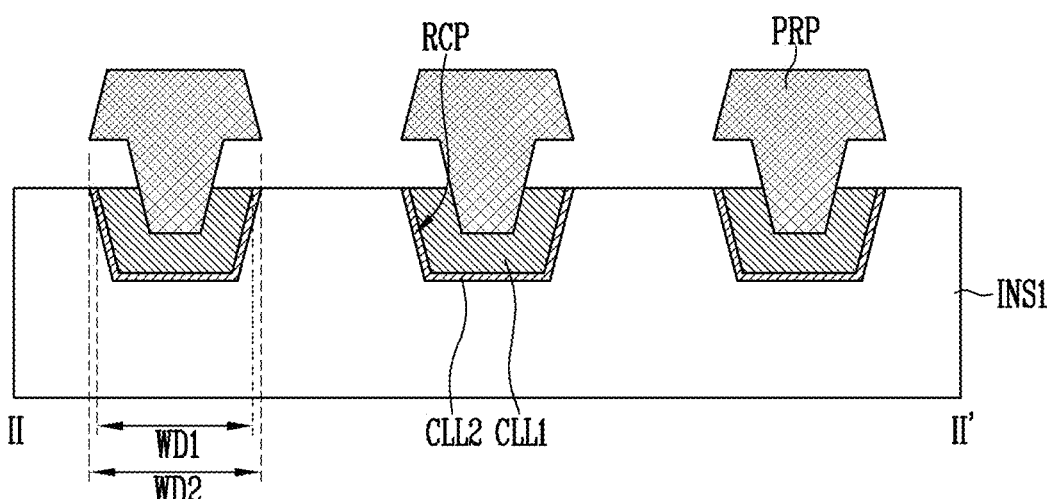

Referring to FIG. 21, the first and second line layers CCL1 and CCL2 may be patterned using the photoresist pattern PRP as an etch mask.

According to an embodiment, the first line layer CCL1 may be patterned using isotropic etching, for example, wet etching. For example, the first line layer CCL1 may be patterned through wet etching, so that it may have a narrower width than the photoresist pattern PRP. That is, the width WD1 of the first line layer CCL1 may be narrower than the width WD2 of the photoresist pattern PRP.

The second line layer CCL2 may be patterned using isotropic etching, for example, wet etching. The second line layer CCL2 may be patterned using anisotropic etching, for example, dry etching.

In this way, all of the first and second line layers CCL1 and CCL2 except for the recessed portion RCP overlapping the photoresist pattern PRP may be removed.

Figure 22:
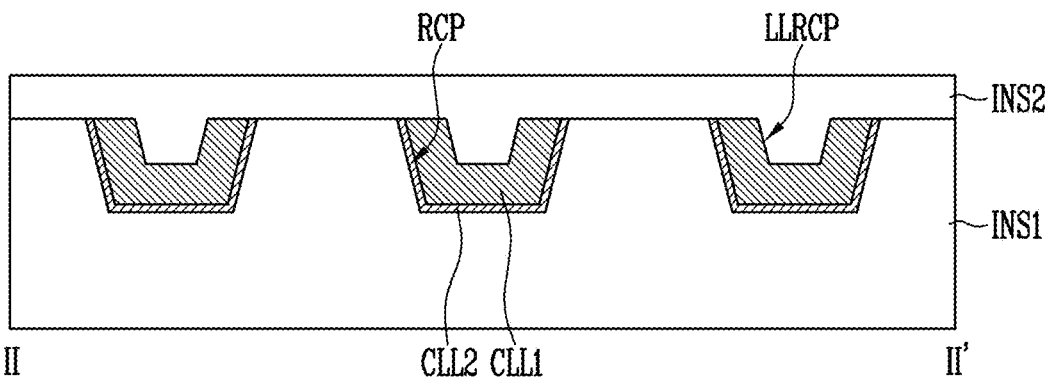

Referring to FIG. 22, the photoresist pattern PRP may be removed. The second insulating layer INS2 may be stacked on a surface of the first insulating layer INS1. The second insulating layer INS2 may cover a surface of the first insulating layer INS1 and the first and second line layers CCL1 and CCL2 disposed within the recess portion RCP.

Referring to FIG. 22, it may be seen that a combined thickness of the first and second line layers CCL1 and CCL2 is less than a depth of the recessed portion RCP. Further, a line layer recess portion LLRCP may be formed upon removal of the photoresist pattern PRP.

Figure 23:
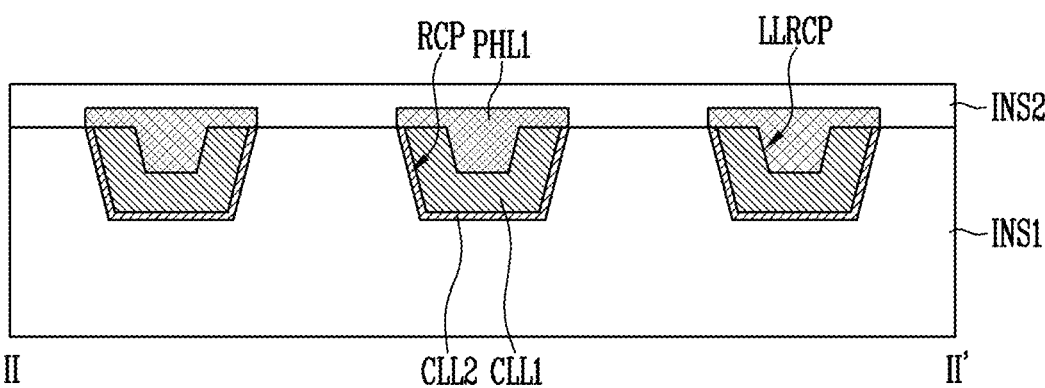

Referring to FIG. 23, the first sub-light blocking layer PHL1 may be formed on a surface of the first insulating layer INS1 to overlap the recess portion RCP. The first sub-light blocking layer PHL1 may be disposed in the line layer recess portion LLRCP. For example, the first sub-light blocking layer PHL1 may fill the line layer recess portion LLRCP. For example, the first sub-light blocking layer PHL1 may be formed through deposition, printing, and coating fixation. However, there is no limitation to the method of forming the first sub-light blocking layer PHL1, and various known methods may be used.

The second insulating layer INS2 may be stacked on the first insulating layer INS1 and the first sub-light blocking layer PHL1. For example, the second insulating layer INS2 may cover a surface of the first insulating layer INS1 and the first sub-light blocking layer PHL1 overlapping the recess portion RCP.

Figure 24:
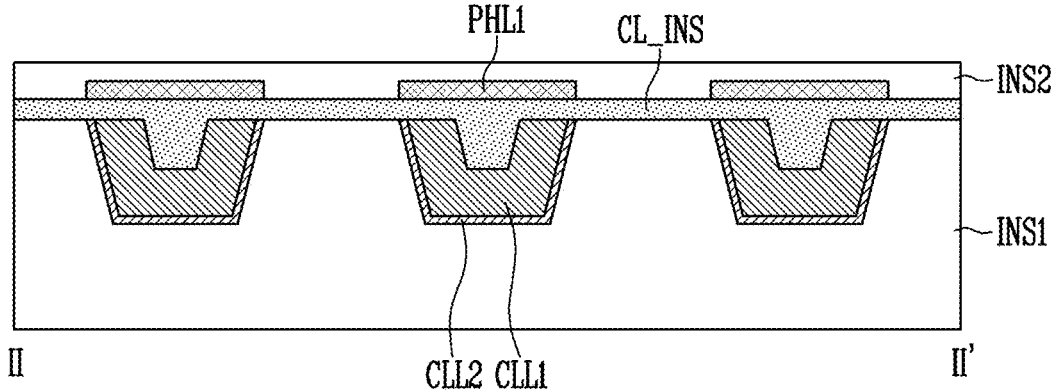

Referring to FIG. 24, the auxiliary insulating layer CL_INS may be formed entirely on a surface of the first insulating layer INS1. The auxiliary insulating layer CL_INS may cover a surface of the first insulating layer INS1 and the first and second line layers CCL1 and CCL2 disposed within the recess portion RCP.

The first sub-light blocking layer PHL1 may be formed on the auxiliary insulating layer CL_INS. The first sub-light blocking layer PHL1 may be formed to overlap the recess portion RCP. The first sub-light blocking layer PHL1 may overlap the first and second line layers CCL1 and CCL2 with the auxiliary insulating layer CL_INS interposed therebetween.

The second insulating layer INS2 may be stacked on the auxiliary insulating layer CL_INS and the first sub-light blocking layer PHL1. The second insulating layer INS2 may cover a surface of the auxiliary insulating layer CL_INS and the first sub-light blocking layer PHL1 overlapping the recess portion RCP.

FIGS. 25 to 30 are drawings for illustrating a manufacturing method of a display device according to another embodiment of the present disclosure.

Hereinafter, with reference to FIGS. 25 to 30, a manufacturing method of a display device including the sensing panel TSP (or touch sensor) described with reference to FIGS. 13 and 14 will be described. In describing FIGS. 25 to 30, descriptions of content that overlaps the content described with reference to FIGS. 13 and 14 may be omitted or simplified.

The first insulating layer INS1' may be configured similarly to the first insulating layer INS1' of FIG. 18.

Figure 25:
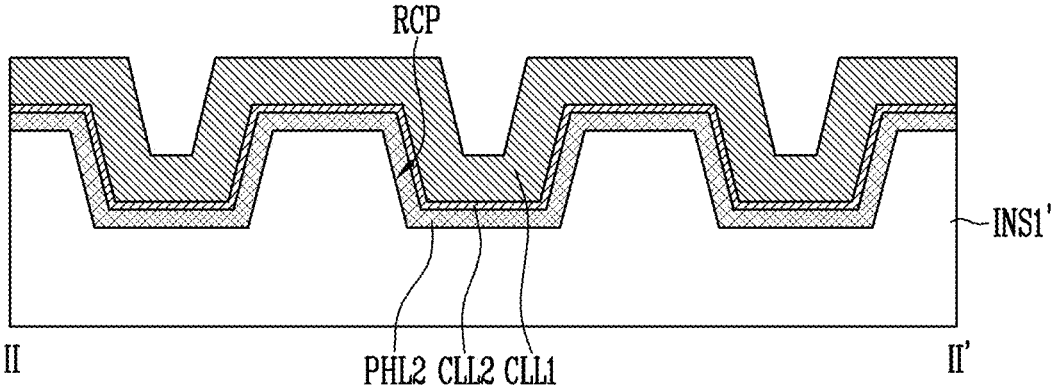
FIGS. 25 to 30 are drawings for illustrating a manufacturing method of a display device according to another embodiment of the present disclosure.

Referring to FIG. 25, the second sub-light blocking layer PHL2 may be formed to entirely cover a surface of the first insulating layer INS1' where the recess portion RCP is formed. For example, the second sub-light blocking layer PHL2 may be formed through deposition, printing, and coating fixation. However, there is no limitation to the method of forming the second sub-light blocking layer PHL2, and various known methods may be used.

The second line layer CCL2 may be formed to entirely cover the second sub-light blocking layer PHL2. For example, the second line layer CCL2 may be formed by providing a first material on a surface of the second sub-light blocking layer PHL2.

Additionally, the first line layer CCL1 may be formed to entirely cover the second line layer CCL2. For example, the first line layer CCL1 may be formed by providing a second material including a low-resistance metal on a surface of the second line layer CCL2 that does not face the first insulating layer INS1'. There is no limitation to the method of forming the first and second line layers CCL1 and CCL2, and various known methods may be used.

In this way, the second sub-light blocking layer PHL2, the second line layer CCL2, and the first line layer CCL1 may be sequentially stacked on a surface of the first insulating layer INS1' where the recess portion RCP is formed.

Figure 26:
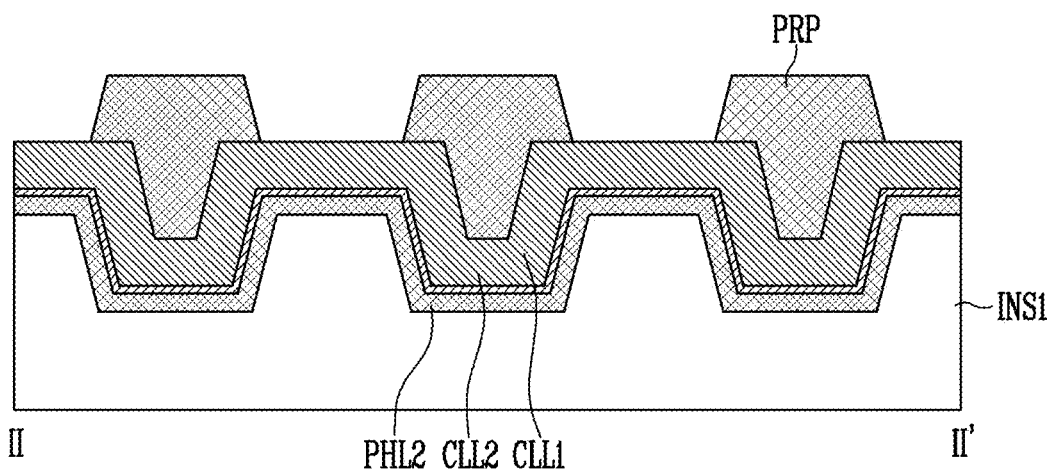

Referring to FIG. 26, the photoresist pattern PRP may be formed on the first line layer CCL1. The photoresist pattern PRP may be a structure remaining after exposure and development processes using a photo mask.

According to an embodiment, the photoresist pattern PRP may be formed to overlap the recess portion RCP. The photoresist pattern PRP may partially cover a surface of the first line layer CCL1. For example, the photoresist pattern PRP may be filled to cover the recess portion RCP. Additionally, the photoresist pattern PRP may include a tapered inclined surface.

Figure 27:
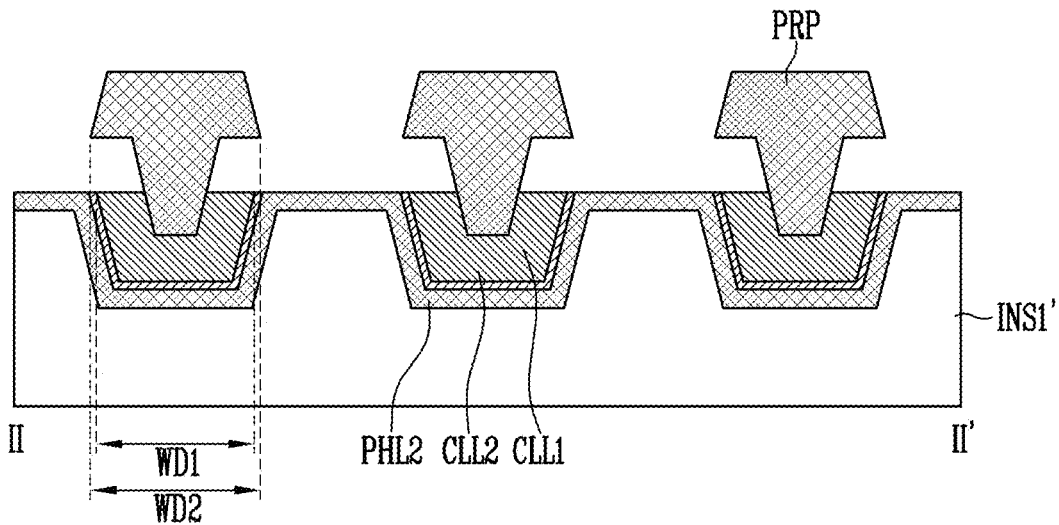

Referring to FIG. 27, the first and second line layers CCL1 and CCL2 may be patterned using a photoresist pattern PRP as an etch mask.

According to an embodiment, the first and second line layers CCL1 and CCL2 may be patterned using isotropic etching, for example, wet etching. For example, the first and second line layers CCL1 and CCL2 may be patterned through wet etching, so that they may have a width that is the same as or narrower than that of the photoresist pattern PRP. For example, the width WD2 of the second line layer CCL2 may be equal to the width WD2 of the photoresist pattern PRP. The width WD1 of the first line layer CCL1 may be narrower than the width WD2 of the photoresist pattern PRP.

In this case, to prevent patterning of the second sub-light blocking layer PHL2, the first and second line layers CCL1 and CCL2 may include materials having an etch selectivity different from that of the second sub-light blocking layer PHL2. That is, when patterning the first and second line layers CCL1 and CCL2, the second sub-light blocking layer PHL2 may function as an etch stop.

As such, at least a portion of the first and second line layers CCL1 and CCL2 may be left at the same height as the second sub-light blocking layer PHL2 within the recessed portion RCP overlapping the photoresist pattern PRP. The remaining portions of the first and second line layers CCL1 and CCL2 may be removed. The second sub-light blocking layer PHL2 may not be removed.

Figure 28:
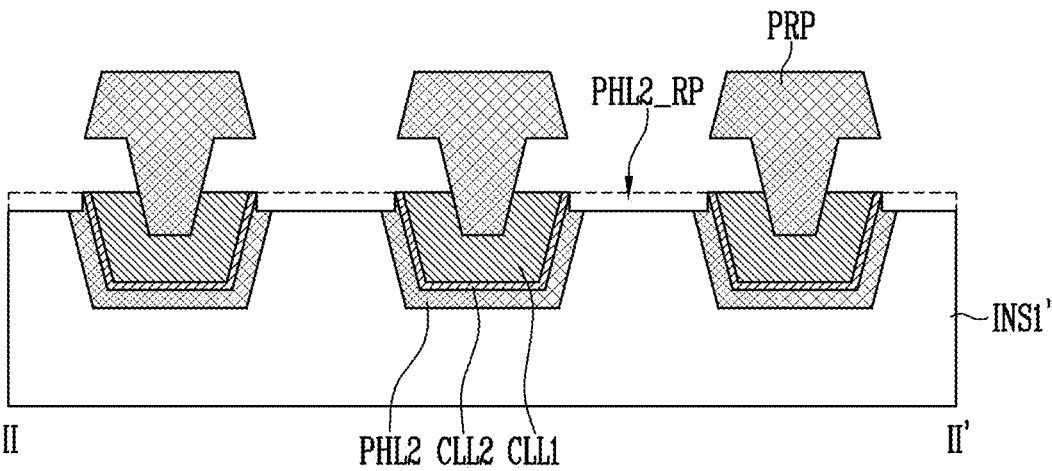

Referring to FIG. 28, the second sub-light blocking layer PHL2 may be patterned using the photoresist pattern PRP as an etch mask.

According to an embodiment, the second sub-light blocking layer PHL2 may be patterned using anisotropic etching, for example, dry etching. The second sub-light blocking layer PHL2 may be patterned in a direction substantially perpendicular to a surface of the first insulating layer INS1' through anisotropic etching. Accordingly, the portion of the second sub-light blocking layer PHL2 that does not overlap the photoresist pattern PRP may be removed by anisotropic etching. For example, the portion of the second sub-light blocking layer PHL2 exposed by the photoresist pattern PRP may be removed by anisotropic etching. The removed portion PHL2_RP may be portions parallel to a surface of the first insulating layer INS1'. The portion of the second sub-light blocking layer PHL2 that overlaps the photoresist pattern PRP may be left without being removed by anisotropic etching. That is, the second sub-light blocking layer excluding the portion overlapping the photoresist pattern PRP may be removed.

By etching the second sub-light blocking layer PHL2 in the vertical direction through anisotropic etching, at least a portion of the first and second line layers CCL1 and CCL2 may protrude from a surface of the first insulating layer INS1'. Additionally, at least a portion of the second sub-light blocking layer PHL2 may protrude together with the first and second line layers CCL1 and CCL2.

Figure 29:
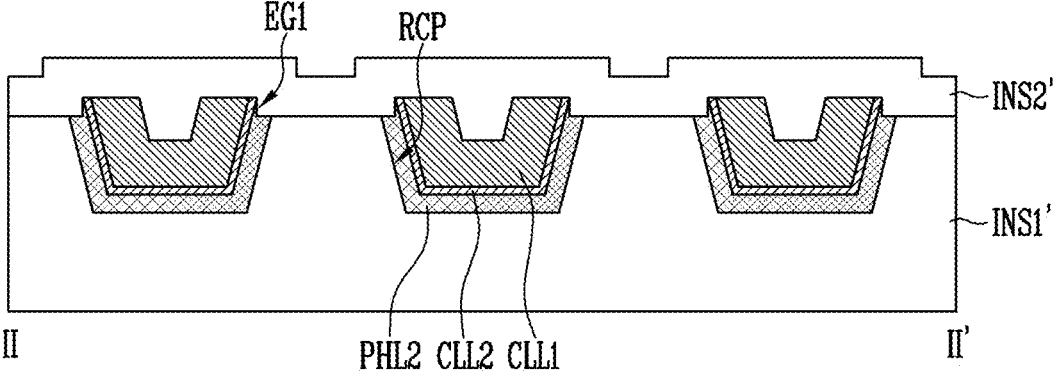

Referring to FIG. 29, the photoresist pattern PRP may be removed. The second insulating layer INS2' may be stacked on a surface of the first insulating layer INS1'. The second insulating layer INS2' may be disposed on a side of the first insulating layer INS1' and may cover the first and second line layers CCL1 and CCL2 overlapping the recess portion RCP, and the second sub-light blocking layer PHL2. However, as at least a portion of the first and second line layers CCL1 and CCL2 may be formed to protrude from a surface of the first insulating layer INS1', at least a portion of the second insulating layer INS2' may be protruded corresponding to the first and second line layers CCL1 and CCL2. For example, the second insulating layer INS2' may be a conformal layer. For example, the second insulating layer INS2' may have a pattern on an upper surface thereof corresponding to protrusions of the first and second line layers CCL1 and CCL2.

Figure 30:
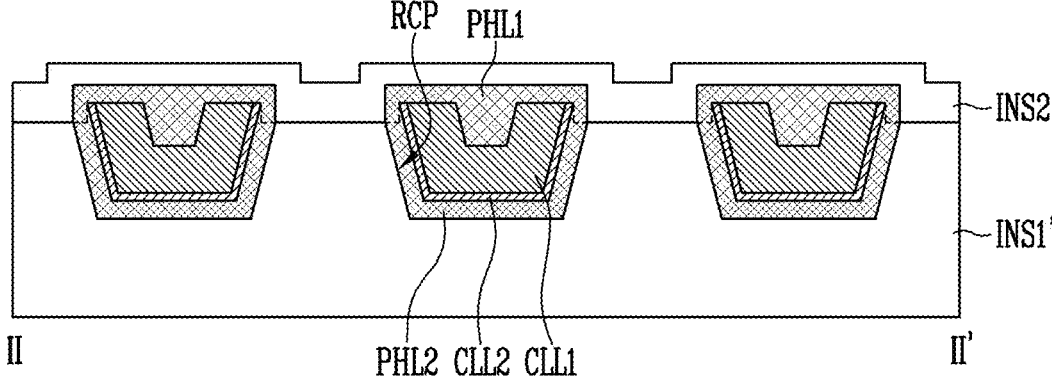

Referring to FIG. 30, the first sub-light blocking layer PHL1 may be formed on a surface of the first insulating layer INS1'. The first sub-light blocking layer PHL1 may be formed to overlap the recess portion RCP. For example, the first sub-light blocking layer PHL1 may be formed to have the same width as the second sub-light blocking layer PHL2. Additionally, the first sub-light blocking layer PHL1 may be disposed to face the second sub-light blocking layer PHL2 with the first and second line layers CCL1 and CCL2 interposed therebetween. The first and second sub-light blocking layers PHL1 and PHL2 may entirely surround the first and second line layers CCL1 and CCL2. For example, the first sub-light blocking layer PHL1 may be formed through deposition, printing, and coating fixation. However, there is no limitation to the method of forming the first sub-light blocking layer PHL1, and various known methods may be used.

The second insulating layer INS2' may be stacked on the first insulating layer INS1' and the first sub-light blocking layer PHL1. The second insulating layer INS2' may cover a surface of the first insulating layer INS1' and the first sub-light blocking layer PHL1 overlapping the recess portion RCP.

FIGS. 31 to 36 are drawings for illustrating a manufacturing method of a display device according to another embodiment of the present disclosure.

Hereinafter, with reference to FIGS. 31 to 36, a manufacturing method of a display device including the sensing panel TSP (or touch sensor) described with reference to FIGS. 16 and 17 will be described. In describing FIGS. 31 to 36, descriptions of content that overlaps the content described with reference to FIGS. 16 and 17 may be omitted or simplified.

The first insulating layer INS1' may be configured similarly to the first insulating layer INS1 of FIG. 18.

Figure 31:
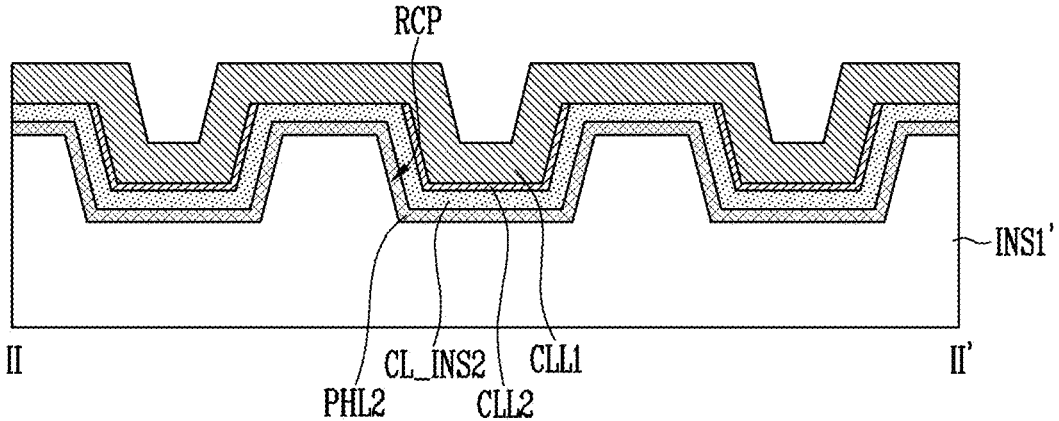
FIGS. 31 to 36 are drawings for illustrating a manufacturing method of a display device according to another embodiment of the present disclosure.

Referring to FIG. 31, the second sub-light blocking layer PHL2 may be formed to entirely cover a surface of the first insulating layer INS1' where the recess portion RCP is formed. For example, the second sub-light blocking layer PHL2 may be formed through deposition, printing, and coating fixation. However, there is no limitation to the method of forming the second sub-light blocking layer PHL2, and various known methods may be used.

The second sub-auxiliary insulating layer CL_INS2 may be formed to entirely cover the second sub-light blocking layer PHL2. For example, the second sub-auxiliary insulating layer CL_INS2 may be formed by providing an inorganic insulating material or an organic insulating material on a surface of the second sub-light blocking layer PHL2. There is no limitation to the method of forming the second sub-auxiliary insulating layer CL_INS2, and various known methods may be used.

The second line layer CCL2 may be formed to entirely cover the second sub-auxiliary insulating layer CL_INS2. For example, the second line layer CCL2 may be formed by providing the first material on a surface of the second sub-light blocking layer PHL2.

Additionally, the first line layer CCL1 may be formed to entirely cover the second line layer CCL2. For example, the first line layer CCL1 may be formed by providing the second material including a low-resistance metal on a surface of the second line layer CCL2 that does not face the first insulating layer INS1'. There is no limitation to the method of forming the first and second line layers CCL1 and CCL2, and various known methods may be used.

In this way, the second sub-light blocking layer PHL2, the second sub auxiliary insulating layer CL_INS2, the second line layer CCL2, and the first line layer CCL1 may be sequentially stacked on a surface of the first insulating layer INS1 where the recess portion RCP is formed.

Figure 32:
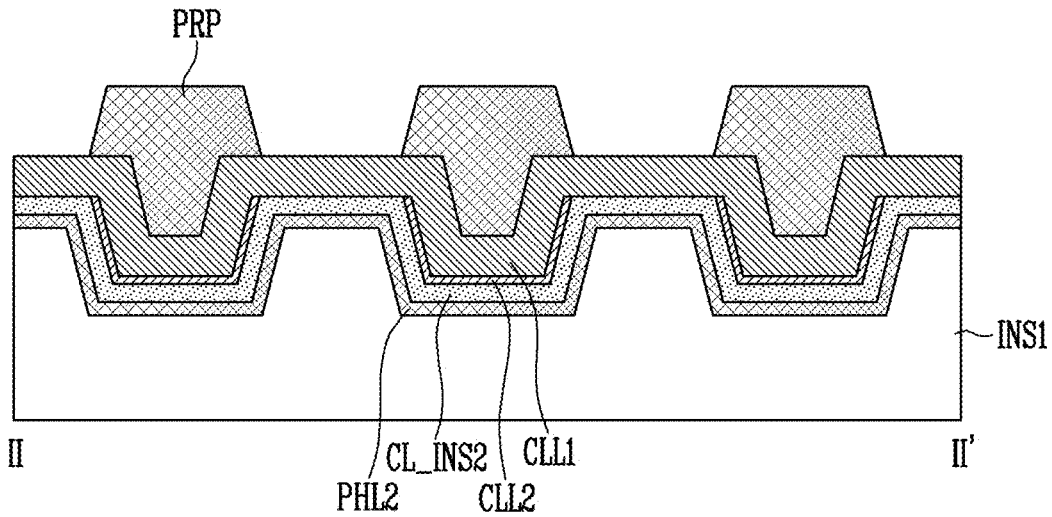

Referring to FIG. 32, the photoresist pattern PRP may be formed on the first line layer CCL1. The photoresist pattern PRP may be a structure remaining after exposure and development processes using a photo mask.

According to an embodiment, the photoresist pattern PRP may be formed to overlap the recess portion RCP. The photoresist pattern PRP may partially cover a surface of the first line layer CCL1. For example, the photoresist pattern PRP may be filled to cover the recess portion RCP. Additionally, the photoresist pattern PRP may include a tapered inclined surface.

Figure 33:
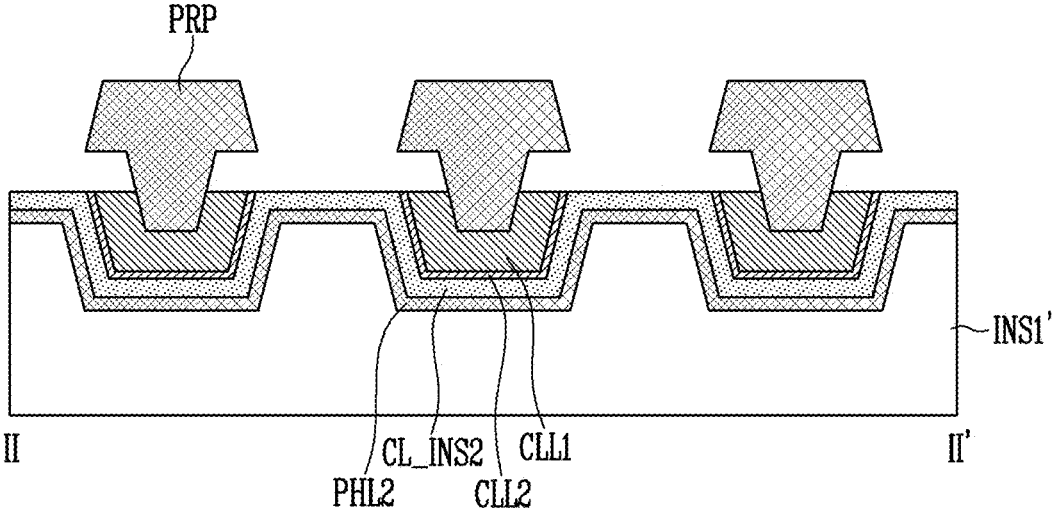

Referring to FIG. 33, the first and second line layers CCL1 and CCL2 may be patterned using the photoresist pattern PRP as an etch mask.

According to an embodiment, the first and second line layers CCL1 and CCL2 may be patterned using isotropic etching, for example, wet etching. In this case, to prevent patterning of the second sub-auxiliary insulating layer CL_INS2, the first and second line layers CCL1 and CCL2 may include materials having an etch selectivity different from that of the second sub-auxiliary insulating layer CL_INS2. That is, when patterning the first and second line layers CCL1 and CCL2, the second sub-auxiliary insulating layer CL_INS2 may function as an etch stop.

As such, at least a portion of the first and second line layers CCL1 and CCL2 may be left at the same height as the second sub-auxiliary insulating layer CL_INS2 within the recessed portion RCP overlapping the photoresist pattern PRP. Remaining portions of the first and second line layers CCL1 and CCL2 may be removed. The second sub auxiliary insulating layer CL_INS2 and the second sub light blocking layer PHL2 may not be removed.

Figure 34:
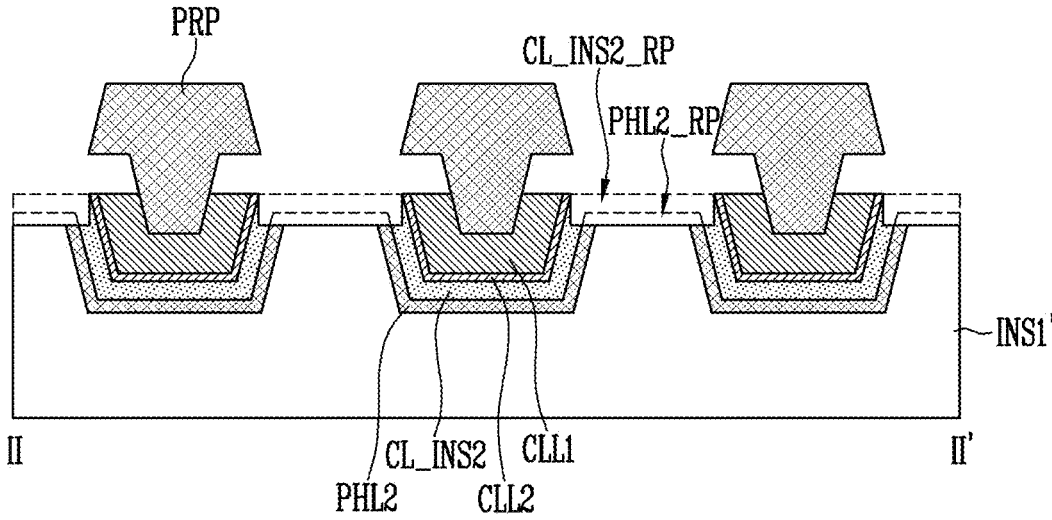

Referring to FIG. 34, the second sub-auxiliary insulating layer CL_INS2 and the second sub-light blocking layer PHL2 may be patterned using the photoresist pattern PRP as an etch mask.

According to an embodiment, the second sub-auxiliary insulating layer CL_INS2 and the second sub-light blocking layer PHL2 may be patterned using anisotropic etching, for example, dry etching. The second sub auxiliary insulating layer CL_INS2 and the second sub light blocking layer PHL2 may be patterned in a direction substantially perpendicular to a surface of the first insulating layer INS1' through anisotropic etching. Accordingly, a portion of the second sub-auxiliary insulating layer CL_INS2 that does not overlap the photoresist pattern PRP may be removed by anisotropic etching. For example, a portion of the second sub-auxiliary insulating layer CL_INS2 exposed by the photoresist pattern PRP may be removed by anisotropic etching. Additionally, a portion of the second sub-light blocking layer PHL2 that does not overlap the photoresist pattern PRP may be removed by anisotropic etching. For example, a portion of the second sub-light blocking layer PHL2 exposed by the photoresist pattern PRP may be removed by anisotropic etching. The removed portions CL_INS2_RP and PHL2_RP may be portions parallel to a surface of the first insulating layer INS1'. A portion of the second sub-auxiliary insulating layer CL_INS2 and the second sub-light blocking layer PHL2 that overlaps the photoresist pattern PRP may be left without being removed by anisotropic etching. That is, the second sub-auxiliary insulating layer CL_INS2_RP and the second sub-light blocking layer, excluding the portion overlapping the photoresist pattern PRP, may be removed.

By etching the second sub-auxiliary insulating layer CL_INS2 and the second sub-light blocking layer PHL2 in the vertical direction through anisotropic etching, at least a portion of the first and second line layers CCL1 and CCL2 may protrude from a surface of the first insulating layer INS1'. Additionally, at least a portion of the second sub-auxiliary insulating layer CL_INS2 may protrude above the surface of the first insulating layer INS1', together with the first and second line layers CCL1 and CCL2.

Figure 35:
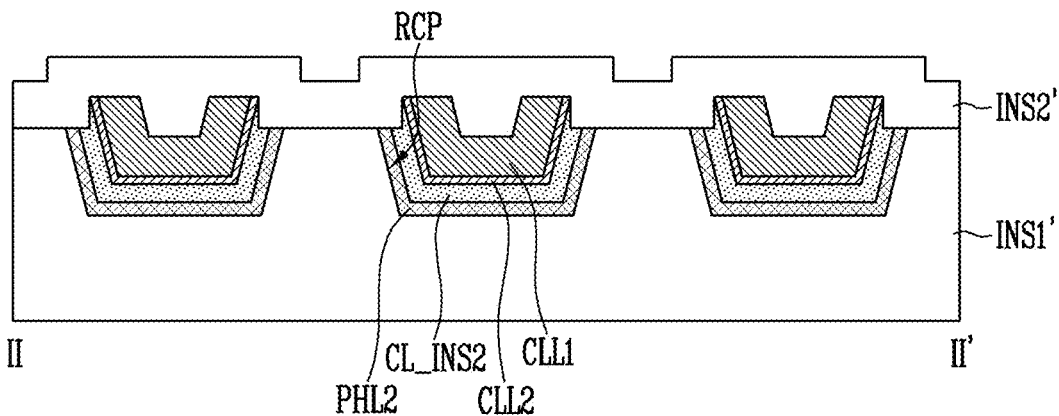

Referring to FIG. 35, the photoresist pattern PRP may be removed. The second insulating layer INS2' may be stacked on a surface of the first insulating layer INS1'. The second insulating layer INS2' may be disposed on a surface of the first insulating layer INS1' and may cover the first and second line layers CCL1 and CCL2 overlapping the recess portion RCP, the second sub-light blocking layer PHL2, and the second sub-auxiliary insulating layer CL_INS2. However, as at least a portion of the first and second line layers CCL1 and CCL2 may be formed to protrude above the surface of the first insulating layer INS1', at least a portion of the second insulating layer INS2' may be protruded corresponding to the first and second line layers CCL1 and CCL2. For example, the second insulating layer INS2' may be a conformal layer. For example, the second insulating layer INS2' may have a pattern on an upper surface thereof corresponding to protrusions of the first and second line layers CCL1 and CCL2.

Figure 36:
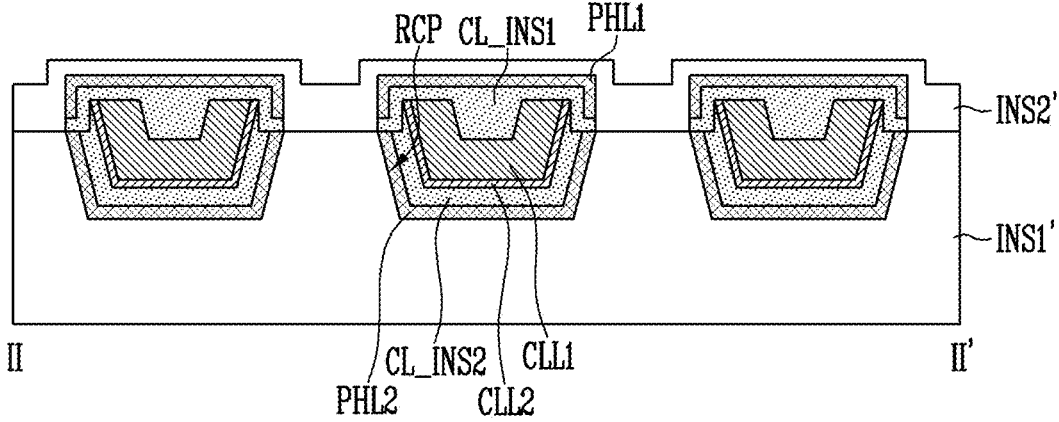

Referring to FIG. 36, the first sub-auxiliary insulating layer CL_INS1 may be formed on a surface of the first insulating layer INS1'. The first sub-auxiliary insulating layer CL_INS1 may be formed to overlap the recess portion RCP. The first sub-light blocking layer PHL1 may be formed on the first sub-auxiliary insulating layer CL_INS1 to overlap the first sub-auxiliary insulating layer CL_INS1. For example, the first sub-auxiliary insulating layer CL_INS1 may be formed to have the same width as the second sub-light blocking layer PHL2. Additionally, the first sub-light blocking layer PHL1 may be formed to have the same width as the first sub-auxiliary insulating layer CL_INS1.

The first sub-auxiliary insulating layer CL_INS1 may be disposed to face the second sub-auxiliary insulating layer CL_INS2 with the first and second line layers CCL1 and CCL2 interposed therebetween. The first and second sub-auxiliary insulating layers CL_INS1 and CL_INS2 may entirely surround the first and second line layers CCL1 and CCL2. There is no limitation to the method of forming the first and second sub-auxiliary insulating layers CL_INS1 and CL_INS2, and various known methods may be used.

Additionally, the first sub-light blocking layer PHL1 may be disposed to face the second sub-light blocking layer PHL2 with the first and second sub-auxiliary insulating layers CL_INS1 and CL_INS2 interposed therebetween. The first and second sub-light blocking layers PHL1 and PHL2 may entirely surround the first and second sub-auxiliary insulating layers CL_INS1 and CL_INS2. For example, the first sub-light blocking layer PHL1 may be formed through deposition, printing, and coating fixation. However, there is no limitation to the method of forming the first sub-light blocking layer PHL1, and various known methods may be used.

The second insulating layer INS2' may be stacked on the first insulating layer INS1'. The second insulating layer INS2' may cover a surface of the first insulating layer INS1' and the first sub-light blocking layer PHL1 overlapping the recess portion RCP. Further, the second insulating layer INS2' may contact side portions of the first sub-auxiliary insulating layers CL_INS1, which may be exposed below the first sub-light blocking layer PHL1.

In the display device according to embodiments of the present disclosure, the first and second conductive lines may be provided within the recess portion, and the reflection of external light may be reduced and visibility may be improved. For example, the first and second conductive lines CL1 and CL2 provided within the recess portion may include the first and second sub-light blocking layers PHL1 and PHL2, so that the reflectance of external light incident on the sensing panel TSP from the outside, can be reduced. According to embodiments of the present disclosure, a display device can provide improved sensing sensitivity even through conductive lines with low resistance.

Although embodiments and applications are described herein, other embodiments and variations may be derived from the above description. Accordingly, the spirit of the present disclosure is not limited embodiments described herein, but extends to the scope of the claims set forth below, various obvious modifications, and equivalents.

According to embodiments of the present disclosure, a display device including a touch sensor with improved sensing sensitivity may be provided.

Effects according to embodiments are not limited by contents exemplified above, and more various effects are included in the present disclosure.

What is claimed is:

1. A An electronic device comprising;
a display device comprising:
a display panel;
a first insulating layer disposed on the display panel; and
a sensing pattern disposed on the first insulating layer and including a plurality of conductive lines;
wherein a surface of the first insulating layer has a recess portion, and
wherein the plurality of conductive lines includes a first line layer disposed within the recess portion, and
a second line layer disposed between the first insulating layer and the first line layer,
wherein uppermost surfaces of the first line layer and the second line layer are coplanar with each other in a thickness direction of the display device.

2. The electronic device of claim 1, wherein the first line layer and the second line layer protrude from the surface of the first insulating layer.

3. The electronic device of claim 1, wherein the first line layer has a line layer recess portion.

4. The electronic device of claim 1, wherein the plurality of conductive lines further includes a light blocking layer disposed on the first line layer and the second line layer.

5. A display device comprising:
a substrate;
a plurality of pixels disposed on the substrate;
a first insulating layer disposed on the plurality of pixels;
a sensing pattern disposed on the first insulating layer and including a plurality of conductive lines; and
a second insulating layer disposed on the sensing pattern,
wherein the first insulating layer has a recess portion on a surface facing the sensing pattern, and
wherein the plurality of conductive lines includes
a first line layer disposed within the recess portion, and
a second line layer disposed between the first insulating layer and the first line layer,
wherein uppermost surfaces of the first line layer and the second line layer are coplanar with each other in a thickness direction of the display device.

6. The display device of claim 5, wherein the plurality of conductive lines further includes a light blocking layer disposed on the first line layer and the second line layer.

7. The display device of claim 6, wherein the light blocking layer is disposed between the plurality of conductive lines and the second insulating layer.

8. The display device of claim 6, wherein the light blocking layer is disposed between the recess portion of the first insulating layer and the second line layer, and partially surrounds the second line layer.

9. The display device of claim 8, wherein the first line layer has a bottom surface adjacent to the first insulating layer, an top surface opposite to the bottom surface and adjacent to the second insulating layer, and first and second side surfaces connecting the bottom surface and the top surface, and the light blocking layer is disposed on the top surface of the first line layer.

10. The display device of claim 6, wherein the light blocking layer includes a colored metal material or a light blocking material.

11. The display device of claim 6, wherein the plurality of conductive lines further includes an auxiliary insulating layer.

12. The display device of claim 11, wherein the light blocking layer is disposed between the first line layer and the second insulating layer, and
the auxiliary insulating layer is disposed between the first line layer and the light blocking layer.

13. The display device of claim 11, wherein the light blocking layer is disposed between the second line layer and the first insulating layer, and
the auxiliary insulating layer is disposed between the second line layer and the light blocking layer.

14. The display device of claim 11, wherein the light blocking layer includes a first sub-light blocking layer disposed between the first line layer and the second insulating layer, and a second sub-light blocking layer disposed between the second line layer and the first insulating layer, and the auxiliary insulating layer includes a first sub-auxiliary insulating layer disposed between the first line layer and the first sub-light blocking layer, and a second sub-auxiliary insulating layer disposed between the second line layer and the second sub-light blocking layer.

15. The display device of claim 5, wherein the first insulating layer includes a low-temperature inorganic layer or a low-temperature organic layer.

16. The display device of claim 5, wherein the first line layer includes copper, and the second line layer includes titanium.

17. The display device of claim 5, wherein the recess portion has a polygonal shape or a rounded shape when viewed in cross section.

18. A manufacturing method of a display device comprising:

providing a display panel;

providing a first insulating layer on the display panel;

forming a plurality of sensing patterns on the first insulating layer, each sensing pattern including a plurality of conductive lines; and providing a second insulating layer on the plurality of sensing patterns, wherein the forming of the plurality of sensing patterns includes forming a recess portion on a surface of the first insulating layer facing the plurality of sensing patterns;

providing a first material within the recess portion;

providing a second material within the recess portion including a low-resistance metal on the first material; and forming a first line layer disposed in the recess portion and a second line layer disposed between the first line layer and the first insulating layer by removing a portion of the first material and a portion of the second material to expose a portion of the surface of the first insulating layer, wherein the first line layer is formed from the second material, and the second line layer is formed from the first material, wherein uppermost surfaces of the first line layer and the second line layer are coplanar with each other in a thickness direction of the display device.

19. The manufacturing method of claim 18, wherein the forming of the plurality of sensing patterns further includes forming a light blocking layer overlapping the recess portion and partially surrounding the first line layer and the second line layer.

20. The manufacturing method of claim 19, wherein the forming of the plurality of sensing patterns further includes forming an auxiliary insulating layer disposed between the light blocking layer and at least one of the first line layer or the second line layer.

* * * * *